United States Patent [19]
Tabata et al.

[11] Patent Number: 5,415,056
[45] Date of Patent: May 16, 1995

[54] SHIFT CONTROL SYSTEM FOR MANUALLY SHIFTABLE AUTOMATIC TRANSMISSION

[75] Inventors: Atsushi Tabata, Okazaki; Yasuo Hojo, Nagoya; Takayuki Okada; Masato Kaigawa, both of Toyota; Yutaka Taga, Aichi; Masashi Hattori, Anjo; Takeshi Inuzuka, Ansho; Yoshito Takeshita, Anjo; Tsutae Takeda, Miyazaki; Takanori Wakasugi, Sabae; Kazuyuki Suzuki, Takefu; Masahito Inaba, Anjo, all of Japan

[73] Assignees: Toyota Jidosha Kabushiki Kaisha, Toyota; Aishin AW Co., Ltd., Anjo, both of Japan

[21] Appl. No.: 66,231

[22] Filed: May 25, 1993

[30] Foreign Application Priority Data

Sep. 21, 1992 [JP] Japan .................................. 4-274792
Sep. 21, 1992 [JP] Japan .................................. 4-274793

[51] Int. Cl.⁶ .............................................. B60K 20/10
[52] U.S. Cl. .................................... 74/335; 74/473 R
[58] Field of Search .............................. 74/335, 473 R

[56] References Cited

U.S. PATENT DOCUMENTS

| | | |
|---|---|---|
| 3,292,450 | 12/1966 | Hurst et al. ................. 74/473 R |
| 4,905,530 | 3/1990 | Stehle et al. . |
| 4,987,792 | 1/1991 | Mueller et al. . |
| 5,009,128 | 4/1991 | Seidel et al. . |
| 5,044,220 | 9/1991 | Raff et al. . |
| 5,056,376 | 10/1991 | Moroto et al. . |
| 5,062,314 | 11/1991 | Maier et al. . |

FOREIGN PATENT DOCUMENTS

| | | |
|---|---|---|
| 61-157855 | 7/1986 | Japan . |
| 3-107660 | 5/1991 | Japan . |
| 3-107661 | 5/1991 | Japan . |
| 3-107662 | 5/1991 | Japan . |
| 3-107663 | 5/1991 | Japan . |
| 3-153956 | 7/1991 | Japan . |
| 4-46267 | 2/1992 | Japan . |
| 4-185955 | 7/1992 | Japan . |

Primary Examiner—Dirk Wright
Attorney, Agent, or Firm—Oblon, Spivak, McClelland, Maier, & Neustadt

[57] ABSTRACT

A shift control system for an automatic transmission, comprising a shift unit for selecting by manipulating a shift lever an automatic shift mode, in which a gear stage is determined on the basis of a running state of a vehicle, and a manual shift mode in which a gear state is determined from an output signal based on the manipulation. The shift unit has a drive range capable of setting a plurality of forward gear stages and a plurality of range positions arrayed and includes: a first shift path for guiding the shift lever into the range positions; a second shift path intersecting the first shift path for guiding the shift lever; two third shift paths formed at the two end portions of the second shift path, the third shift paths having at their individual end portions gear stage positions for indicating the forward gear stages in the automatic shift mode and for guiding the shift lever; and a manual shift instructor for outputting a signal instructing a gear stage corresponding to the gear stage position when the shift lever is moved to the gear stage position. The shift control system comprises a gear stage setter for setting the gear stage which is instructed by the output signal of the manual shift instructor.

20 Claims, 28 Drawing Sheets

FIG. 5

| SHIFT POSITION | | MANUAL SWITCH | | | |
|---|---|---|---|---|---|
| | | FR | RR | LH | RH |
| P,R,N,D,S,L | | × | × | × | × |
| MANUAL MODE DECIDED | 4TH | × | ○ | × | ○ |
| | 3RD | ○ | × | × | ○ |
| | 2ND | × | ○ | ○ | × |
| | 1ST | ○ | × | ○ | × |
| SHIFTING TRANSITION | D-RANGE CONTROL | × | × | × | ○ |
| | | × | × | ○ | × |
| TROUBLE | D-RANGE CONTROL | × | ○ | ○ | ○ |
| | | ○ | ○ | × | ○ |
| | | × | ○ | × | × |
| | | ○ | × | ○ | ○ |
| | | ○ | × | × | × |
| | | ○ | ○ | ○ | × |
| | | × | × | ○ | ○ |
| | | ○ | ○ | × | × |
| | | ○ | ○ | ○ | ○ |

FIG. 10

| POSITION | | | SOLENOID | | | CLUTCH | | | BRAKE | | | |
|---|---|---|---|---|---|---|---|---|---|---|---|---|
| | | | $S_{L1}$ | $S_{L2}$ | $S_{L3}$ | $C_1$ | $C_2$ | $C_0$ | $B_1$ | $B_2$ | $B_3$ | $B_0$ |
| D | AUTO. | 1ST | ○ | × | × | ○ | × | ○ | × | × | × | × |
| | | 2ND | ○ | ○ | × | ○ | × | ○ | × | ○ | × | × |
| | | 3RD | × | ○ | × | ○ | ○ | ○ | × | ○ | × | × |
| | | 4TH | × | × | × | ○ | ○ | × | × | ○ | × | ○ |
| | MANU. | 1ST | ○ | × | ○ | ○ | × | ○ | × | × | ○ | × |
| | | 2ND | ○ | ○ | ○ | ○ | × | ○ | ○ | ○ | × | × |
| S | | 1ST | ○ | × | × | ○ | × | ○ | × | × | × | × |
| | | 2ND | ○ | ○ | ○ | ○ | × | ○ | ○ | ○ | × | × |
| | | 3RD | × | ○ | × | ○ | ○ | ○ | × | ○ | × | × |
| | | (3RD) | × | × | × | ○ | ○ | ○ | × | ○ | × | × |
| L | | 1ST | ○ | × | ○ | ○ | × | ○ | × | × | ○ | × |
| | | 2ND | ○ | ○ | ○ | ○ | × | ○ | ○ | ○ | × | × |
| | | (1ST) | × | × | × | ○ | × | ○ | × | × | ○ | × |
| REMARKS | | | ○ : ON | | | ENGAGE | | | | | | |
| | | | × : OFF | | | DISENGAGE | | | | | | |

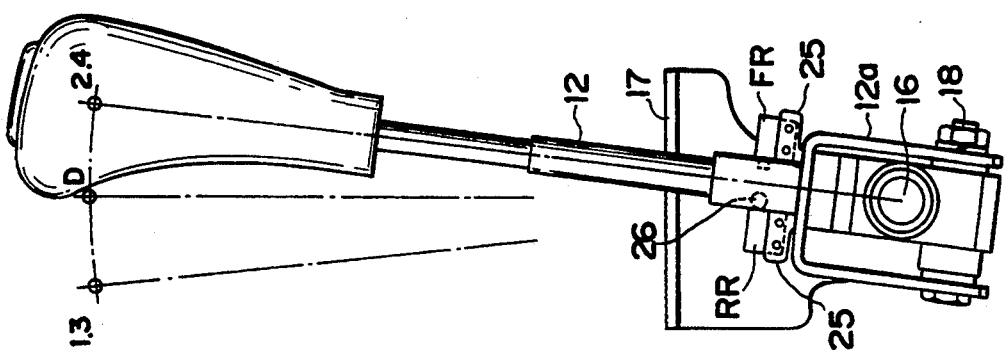
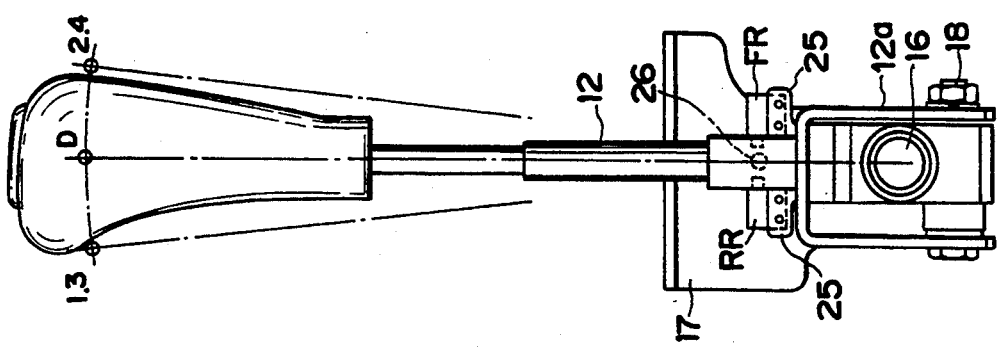
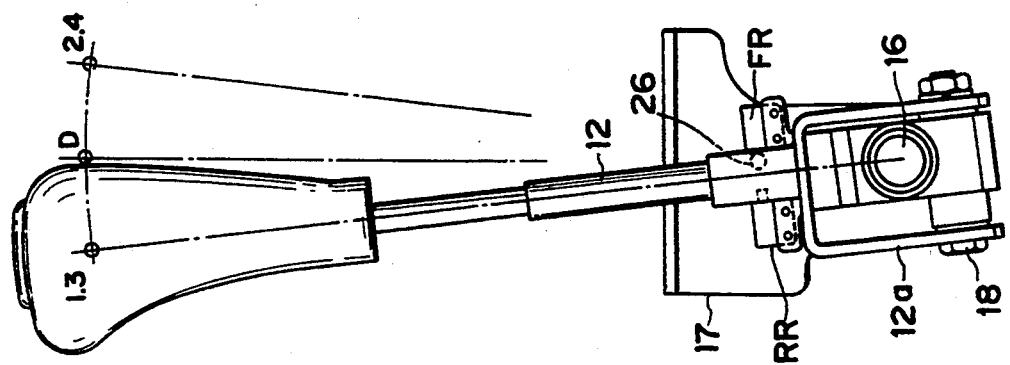

FOR THROTTLE OPENING θ°

SHIFT CONTROL SYSTEM FOR MANUALLY SHIFTABLE AUTOMATIC TRANSMISSION

BACKGROUND OF THE INVENTION

The present invention relates to a shift control system for an automatic transmission capable of effecting an automatic shift mode, in which a shift is executed on the basis of a running state of a vehicle, and a manual shift mode in which a gear stage is selected by the manipulation of a driver.

An automatic transmission for a vehicle basically effects a drive condition suitable a running state such as a throttle opening or a vehicle speed by selecting a gear stage on the basis of the running state. In recent years, there has been frequently used an automatic transmission, in which the running state is detected and converted into electric signals by various sensors, in which the electric signals are computed to determine a gear stage, and in which signals based upon the computation results are outputted to predetermined solenoid valves so that the shift may be executed by actuating the solenoid valves. The so-called "electronic control type automatic transmission" executes the shift directly on the basis of the output signals coming from the computer for the aforementioned computations but can effect the shift by outputting a shift signal on the basis of other input signals without resorting to the computation results based on the running condition. There is known an automatic transmission which is enabled to accomplish the manual shift by making effective use of the degree of freedom of such electronic control type automatic transmission. This known automatic transmission is constructed such that a shift lever is manipulated to output a manual shift signal so that an arithmetic unit may decide a gear stage to be set, on the basis of the manual shift signal, and may output a shift signal for achieving the gear stage.

A shift unit for changing a running range in the automatic shift mode and for switching the shift mode to the manual one and selecting a gear stage in the manual shift mode is disclosed in U.S. Pat. Nos. 4,905,530, 4,987,792, 5,009,128, 5,044,220 and 5,062,314.

In the shift unit disclosed in those U.S. Patent specifications, the individual range positions for the parking (P) range, reverse (R) range, neutral (N) range and drive (D) range in the automatic shift mode are set along a straight groove for guiding a shift lever. In parallel with this straight groove, there is formed a short groove which has one end portion assigned to an upshift position and its other end portion assigned to a downshift position. And, those two grooves are so connected as to transfer the shift lever.

In the shift unit described above, the shift mode is switched from the automatic to manual ones by moving the shift lever from the D-range position to the aforementioned short groove. If the shift lever is moved in the short groove to the upshift position, an upshift switch disposed in the upshift position outputs an ON signal so that an upshift to a gear stage higher by one stage is executed. On the other hand, if the shift lever is moved to the downshift position, a downshift switch disposed in the downshift position outputs an ON signal so that a downshift to a gear stage lower by one stage is executed.

Thus, the shift unit described above can effect the upshift or downshift step by step but cannot perform the so-called "skip shift", in which the gear change is skipped to another higher or lower by two stages or more. In order to effect a shift substantially approximating the skip shift, the shift lever has to be promptly manipulated two times or more so that the shift unit has an unsatisfactory operability.

In U.S. Pat. No. 5,056,376 and Japanese Patent Laid-Open No. 157855/1986, on the other hand, there is disclosed a shift unit which can select the individual gear stages directly in the manual shift mode. In this shift unit, a guide plate for regulating the position of the shift lever is formed with one transverse groove and five or six longitudinal grooves branched from the transverse groove to the two sides. Of these longitudinal grooves, one groove formed at the end portion of the transverse groove is assigned to the parking (P) range position, the reverse (R) range position, the neutral (N) range position and the drive (D) range position, and the remaining four or five grooves are Individually assigned to the shift positions, i.e., the positions for the first to fourth or fifth speeds in the manual shift mode. Moreover, the automatic shift mode is set by setting the shift lever in the D-range position so that the shift is effected on the basis of the detected running state such as the vehicle speed and the throttle opening. Moreover, if the shift lever is positioned in one of the longitudinal grooves assigned to the first to fourth or fifth speeds, the shift mode is switched to the manual one to set the gear stage assigned to that particular longitudinal groove.

According to this shift unit, the gear stage can be directly selected in the manual shift mode. Despite a this advantage, however, the individual range positions in the automatic shift mode and the individual gear stage positions in the manual shift mode are provided in the completely different areas so that a wider space is required for the individual range positions and shift positions. In short, the size of the shift unit is enlarged. Moreover, the stroke for manipulating the shift lever is elongated to deteriorate the operability.

On the other hand, in the shift unit provided with the individual gear stage positions independently in the manual shift mode, there is disposed in each gear stage position a switch which is turned ON so that the shift may be effected on the basis of the signal outputted from the switch. The shift control cannot be effected unless it is decided by an electronic unit in terms of the OFF operations of all the switches that the drive (D) range for the automatic shift is selected. If any switch experiences a short-circuit failure, the D-range cannot be achieved so that the vehicle cannot run in the automatic shift mode. Moreover, if the manual shift switch corresponding to a lower-speed gear stage is short-circuited during the run in the D-range, the electronic control unit decides that the manual shift is executed to the gear stage corresponding to that broken switch, and causes a shift down suddenly. In the manual shift mode, on the other hand, a control can be effected to prefer the higher-speed gear stage by processing the switch signal so as to prevent a downshift to a lower-speed gear stage due to the short-circuit of the switch corresponding to the lower-speed gear stage during the run at the higher-speed gear stage. Then, the shift may probably be fixed at the higher-speed gear stage to make the start impossible if the switch at the higher-speed gear stage is short-circuited.

In the system of the prior art described above, moreover, the selection of the individual ranges in the automatic shift mode and the selection of the individual gear stages in the manual shift mode can be accomplished by moving the shift lever along the transverse groove and by moving the shift lever along the longitudinal grooves perpendicular to the transverse groove. However, the moving direction of the shift lever from the transverse groove is perpendicular to the transverse grove commonly in case a range is to be selected in the automatic shift mode and in case a gear stage is to be selected in the manual shift mode, but the selections are different in the branching positions from the transverse groove in the automatic shift mode and in the manual shift mode. Therefore, in order that the driver may set the shift lever in the gear stage position or the range position desired by himself, he is required to move the shift lever to the desired longitudinal groove after he has confirmed that the shift lever was moved to the end portion of the transverse groove. Thus, the system of the prior art requires the confirming operation of the driver so that its operability is not satisfactory.

Moreover, the shift unit of the prior art is advantageous in that the gear stage can be directly selected in the manual shift mode, but its operation can be carried out by manipulating the shift lever only unlike the manual transmission. Thus, a shifting operation may be performed to a lower-speed stage during the run at a high speed. As a result, the overrun of the engine may probably arise.

Incidentally, in the manual shift mode, the engine braking is effected at all the gear stages. Depending upon the construction of the gear train, therefore, at a shifting time in the manual shift mode, it is necessary to effect the so-called "engagement change", in which engine braking frictional engage means for a gear stage before the shift is disengaged while engine braking frictional engage means for a gear stage after the shift is engaged. If, in this case, the engagement of the other frictional engage means is premature with respect to the disengagement of one frictional engage means, a shifting shock is caused by the tic-up. On the other hand, if the engagement of the other frictional engage means is delayed, the shifting response is deteriorated by the slip. The solution of this problem is of great importance because it is essential especially in the manual shift mode to enhance the shifting response better than in the automatic shift mode.

SUMMARY OF THE INVENTION

A main object of the present invention is to provide a shift control system equipped with a shift unit which is compact and has an excellent operability.

Another object of the present invention is to provide a shift control system which can switch the manual shift mode and the automatic shift mode without fail and can prevent any erroneous shift without fall.

A further object of the present invention to improve the shifting response in the manual shift mode.

A further object of the present invention is to provide a shift control system which can prevent the overrun of the engine.

A further object of the present invention is to prevent the erroneous operation to the neutral state thereby to prevent the overrun of the engine and the deterioration in the riding comfort due to the engine overrun.

According to the present invention, therefore, four gear stage positions to be selected in the manual shift mode are arrayed at the two sides across the array, in which are arranged range positions to be selected in the automatic shift mode, and the gear stage positions are connected by an H-shaped shift path.

One of the gear stages in the manual shift mode is selected by moving the shift lever to any of those gear stage positions. For this selection, there is provided means for deciding the gear stage in terms of the combination of the ON/OFF signals of two switches. This makes it reliable to decide the gear stage in the manual shift mode so that a failure in the switch system can be detected.

In case the shift is to be carried out in the manual shift mode, moreover, an excellent shifting response can be achieved by providing means for disengaging the engine braking frictional engage means when the shift lever is brought out of any of the gear stage positions and for engaging the engine braking frictional engage means at a new gear stage when the shift lever is brought to another gear stage position.

Still moreover, the engine overrun can be prevented by providing means for deciding the gear stage, which can be selected in the manual shift mode, on the basis of the vehicle speed.

If there is additionally provided means for inhibiting the shift lever in the manual shift mode from coming into the neutral range position, it is possible to prevent the neutral state from being erroneously invited in the manual shift mode.

The above and further objects and novel features of the present invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIG. 5 is a table showing the ON/OFF operations of switches to be controlled by the shift lever;

FIG. 10 is an application chart of frictional engage means for setting individual gear stages in an automatic shift mode and in a manual shift mode;

FIGS. 14A, 14B and 14C are top plan views showing a portion of unit for explaining the operations of a mechanism for detecting the longitudinal positions of the shift lever;

DETAILED DESCRIPTION OF THE PREFERRED EMBODIMENTS

Figure 1:
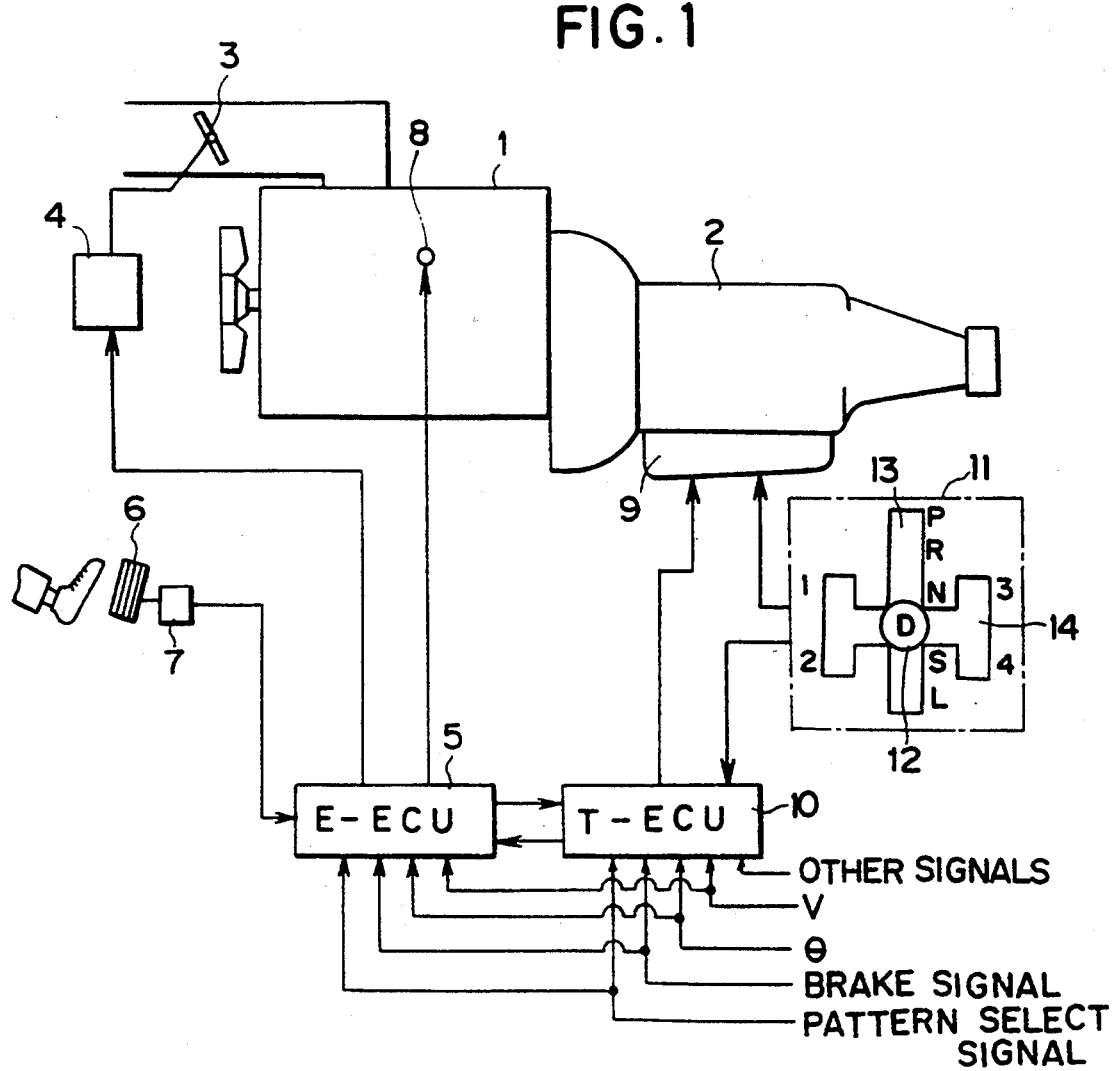
FIG. 1 is a schematic block diagram showing a system according to the present invention.

In FIG. 1, an engine 1 is constructed to control a throttle opening electrically so that its output characteristics may be changed relative to the depression of an accelerator. An automatic transmission 2 is connected to the engine 1 so that it may select an automatic shift mode, in which a gear stage is set according to a running state, and a manual shift mode, in which a gear stage is set on the basis of a manual operation. Specifically, a throttle valve 3 for adjusting the air intake into the engine 1 has its degree of opening changed by an electrically controlled actuator 4 such as a motor, which is controlled by an engine electronic control unit (E-ECU) 5. This electronic control unit 5 is constructed mainly of a central processing unit (CPU), memory elements (ROM, RAM) and an input/output interface and is fed with signals: an output signal from a sensor 7 for detecting the depression of an accelerator pedal 6; a vehicle speed signal; a brake signal which is produced when a side brake switch or a foot brake switch is turned ON; and an engine water temperature signal. In accordance with the depression of the accelerator pedal 6, the electronic control unit 5 energizes the actuator 4 to set the throttle valve to a predetermined opening and controls a fuel injection rate by a fuel injection unit 8 to a value suited for the throttle opening.

On the other hand, the automatic transmission 2 is constructed to control (not-shown) solenoid valves in a hydraulic control system 9 by a transmission electronic control unit (T-ECU) 10 and causes a (not-shown) manual valve to be operated by a shift unit 11 actuated by a shift lever thereby to set a predetermined gear stage.

The transmission electronic control unit 10 is constructed mainly of a central processing unit (CPU), memory elements (ROM and RAM) and an input/output interface. In response to a signal inputted from the shift unit 11, the electronic control unit 10 decides the automatic shift mode and the manual shift mode, the range, and the gear stage in the manual shift mode. The transmission electronic control unit 10 is also constructed to output a shift instruct signal to the hydraulic control system 9 and a signal instructing each shift mode to the engine electronic control unit 5. This transmission electronic control unit 10 is fed with a vehicle speed V, an accelerator depression $\theta$, a brake signal, an engine water temperature signal, a pattern select signal and so on. In response to the signal of each shift mode, on the other hand, the engine electronic control unit 5 changes the signal value, which corresponds to the output characteristics of the engine, i.e., the depression of the accelerator pedal 6 and which is to be fed to the actuator 4, into the value corresponding to each shift mode so that the engine output may have high characteristics in the manual shift mode.

The shift unit 11 is operated by a shift lever 12 to switch the automatic shift mode and the manual shift mode, to select a range in the automatic shift mode and to select a gear stage in the manual shift mode. The positions for selecting the individual ranges in the automatic shift mode are arrayed in a row, as shown in FIG. 1. Specifically, the shift unit 11 is formed with an I-shaped groove 13 for guiding the shift lever 12 into the range positions which are arranged downward in FIG. 1 with a parking (P) range, a reverse (R) range, a neutral (N) range, a drive (D) range, an "S" range and an "L" range. Moreover, the gear stages to be selected in the manual shift mode are the four stages for the first to fourth forward speeds. The gear stage positions for selecting these gear stages are arranged at the righthand and lefthand sides across the I-shaped groove 13. Specifically, the shift unit 11 is formed an H-shaped groove 14 which crosses the I-shaped groove 13 at the D-range position. The gear stage positions for the first to fourth speeds are assigned to the four ends of that H-shaped groove 14, as designated by corresponding numerals in FIG. 1. The It-shaped groove 14 forms a first partial shift path across the I-shaped groove 13 and second partial shift paths formed at each end of the first partial shift path.

The shift unit 11 is specifically exemplified in FIGS. 2A, 2B and 2C and FIG. 3.

Figure 4:
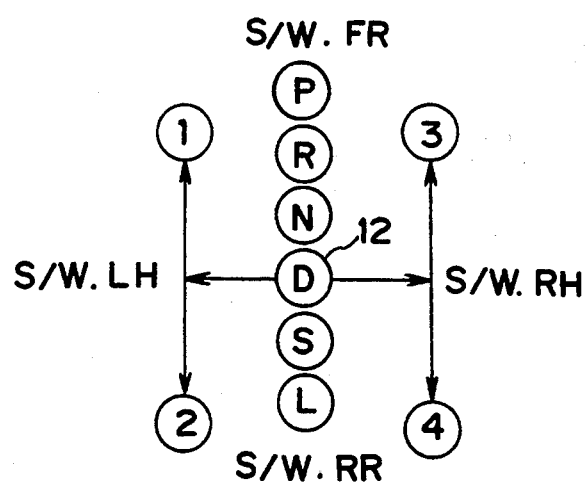
FIG. 4 is a diagram for explaining the layout of the position of individual ranges and gear stages.

The shift unit 11 described above is constructed of: a stationary member 15 fixed on the not-shown car body; a retainer 17 which is so mounted in the stationary member 15 that it is supported to rock back and forth on a transverse pin 16 extending transversely of the car body and which is connected to the manual valve; the shift lever 12 which is so supported to rock on a longitudinal pin 18 intersecting the transverse pin 16 as to rock and tilt in the directions identical to and intersecting the rocking direction of the retainer 17; a disconnecting mechanism for disconnecting the shift lever 12 in a predetermined shift position (e.g., the D-position in the automatic shift mode in the present example) from the retainer 17; and switches SH and SR for detecting the tilting and rocking motions of the shift lever 12 disconnected. Moreover, a switch SW is composed, as shown in FIG. 4, of: a pair of till detect switches (SH) RH and LH for detecting the rightward and leftward tilting motions of the shift lever 12 from the D-range position; and a pair of rock detect switches (SR) FR and RR for detecting the forward and backward rocking motions in the tilting position. The electronic control unit 10 further includes arithmetic operation means for determining a gear stage in combinations of the signals detected by those individual switches.

The details of the constructions of the individual portions will be described in the following. The stationary member 15 is composed of a base 15b having an opening 15a at its center, and a pair of side plates 15c rising at the righthand and lefthand sides of the opening 15a. A bolt constructing the transverse pin 16 is fitted in and supported by a pair of brackets 15d which extend downward from the righthand and lefthand edges of the opening 15a. This bolt constructs a support member for supporting a cross sleeve 19, which is formed with bolt holes crossing each other, on the stationary member 15 in a manner to rock back and forth, and is fitted in one of the bolt holes of the cross sleeve 19. In the other bolt hole of the cross sleeve 19, there is fitted the bolt which is inserted into a fork 12 leading downward from the shift lever 12 thereby to construct the longitudinal pin 18 or the center of the tilting motion of the shift lever 12.

The retainer 17 is formed into a downward channel shape which has its upper Face fixing a gate plate 17a and its one side plate fixing a lever-shaped manual valve connect member 17b at its lower end. Here, the stationary member 15 is arranged with: an inhibit mechanism 20 which is released when in the automatic shifting operation by a push button 12b at the upper portion of the shift lever 12 and brought into and out of engagement with a cam hole 17c of the retainer 17; and a detent mechanism 21 which is disposed between the cross sleeve 19 and the retainer 17 for holding the shift lever 12 in each of the positions when in the manual shifting operating and for establishing a proper feel during the movement of the shift lever 12 between the positions.

Figure 3:
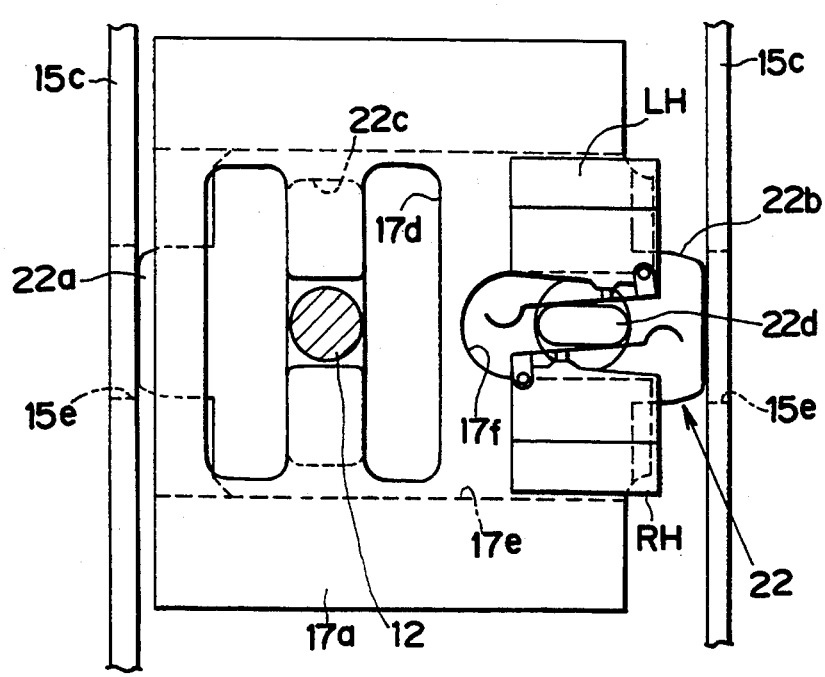
FIG. 3 a top plan view showing a mechanism for transmitting the longitudinal and transverse motions of the shift lever to another member.

As detailed in FIG. 3 the gate plate 17a is formed with: a gate hole 17d having an H-shaped top plan view and fitting a stem 12d of the shift lever 12; a lock plate sliding groove 17e extending transversely in the lower face of the gate plate 17a; and a notched groove 17f notched from one side face to have its depth formed into a cylindrical shape.

The aforementioned disconnecting mechanism is composed of a lock plate 22, which is fitted in the lock plate sliding groove 17e of the gate plate 17a, and the side plate 15c of the stationary member 15. The lock plate 22 is formed of a cross plate, as seen in a top plan view, to have ears 22a and 22b at its two sides. The lock plate 22 is formed in its center with an I-shaped engage hole 22c to have the stem 12d of the shift lever 12 fitted therein and is equipped with a switch actuating boss 22d anchored on the upper face of its one side. The lock plate 22 thus constructed engages, when the shift lever 12 tilts to the right and left on the longitudinal pin 18, with the stem 12d of the shift lever 12 at its engage hole 22c and slides transversely while being guided by the lock plate slide groove 17e. When the shift lever 12 rocks back and forth on the transverse pin 16, the hock plate 22 is not associated with the motion of the stem 12d. The ears 22a and 22d of the lock plate 22 are brought by the rightward and leftward tiling motions of the shift lever 12 into engagement with rectangular holes 15e which are formed in the upper portions of the two side plates 15c of the stationary member 15.

In addition, over the cross sleeve 19 and the fork 12a of the shift lever 12, there is provided neutral return means for the shift lever 12 in the D-range position. This means is composed of: a torsion spring 23 having its coil portion wound on the outer circumference of the front portion of the cross sleeve 19; and projections located at the sides of the cross sleeve 19 and the fork 12a and clamped between the two parallel actuation ends 23a and 23b of the torsion spring 23. As a result, when the shift lever 12 is tilted to the right or left relative to the cross sleeve 19, the projection at the fork 12a leaves one of the two actuation ends 22a and 22b of the torsion spring 23 whereas the projection at the cross sleeve 19 still supports the other actuation end, so that the neutral returning force is exerted upon the shift lever 12 by the torsion spring 23.

Of the aforementioned four detect switches, the paired switches RH and LH are so arranged on the upper face of the gate plate 17a and across the notched groove 17f, as shown in FIG. 3, as to detect the tilting motion of the shift lever 12 in terms of the rightward and leftward motions of the lock plate 22. Thus, the switches RH and LH can be turned ON/OFF by the switch actuating boss 22d which is anchored on the upper face of the lock plate 22. Specifically, when the shift lever 12 is tilted rightward on the longitudinal pin 18 while being positioned in the connection portion of the It-shaped hole of the gate plate 17a, the lock plate 22 is accordingly moved rightward to turn ON the rear switch RH. In the opposite case, the front switch LH is turned ON.

Figure 2A:
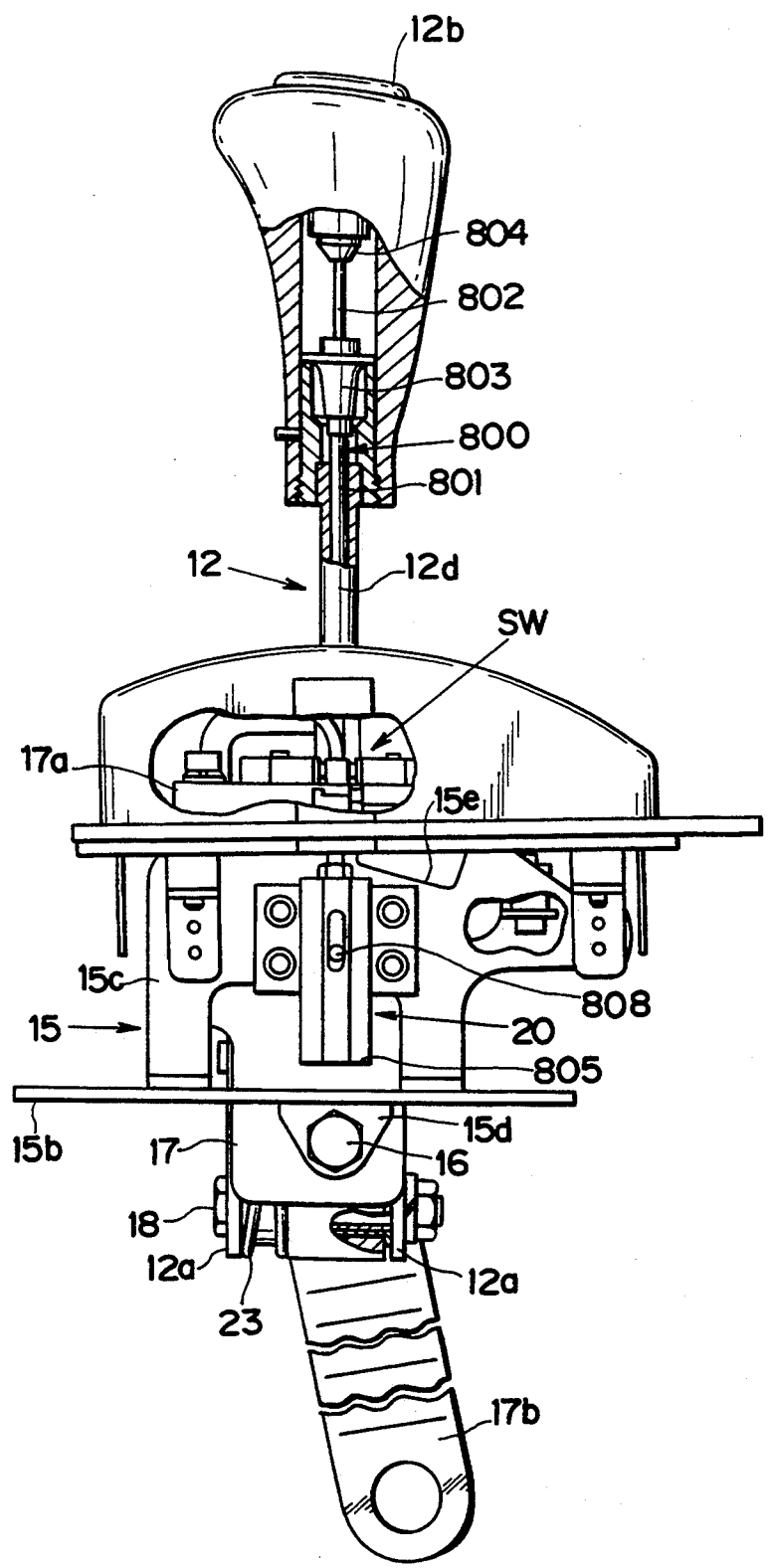
FIG. 2A is a side elevation showing one example of a shift unit to be used in the present invention.
Figure 2B:
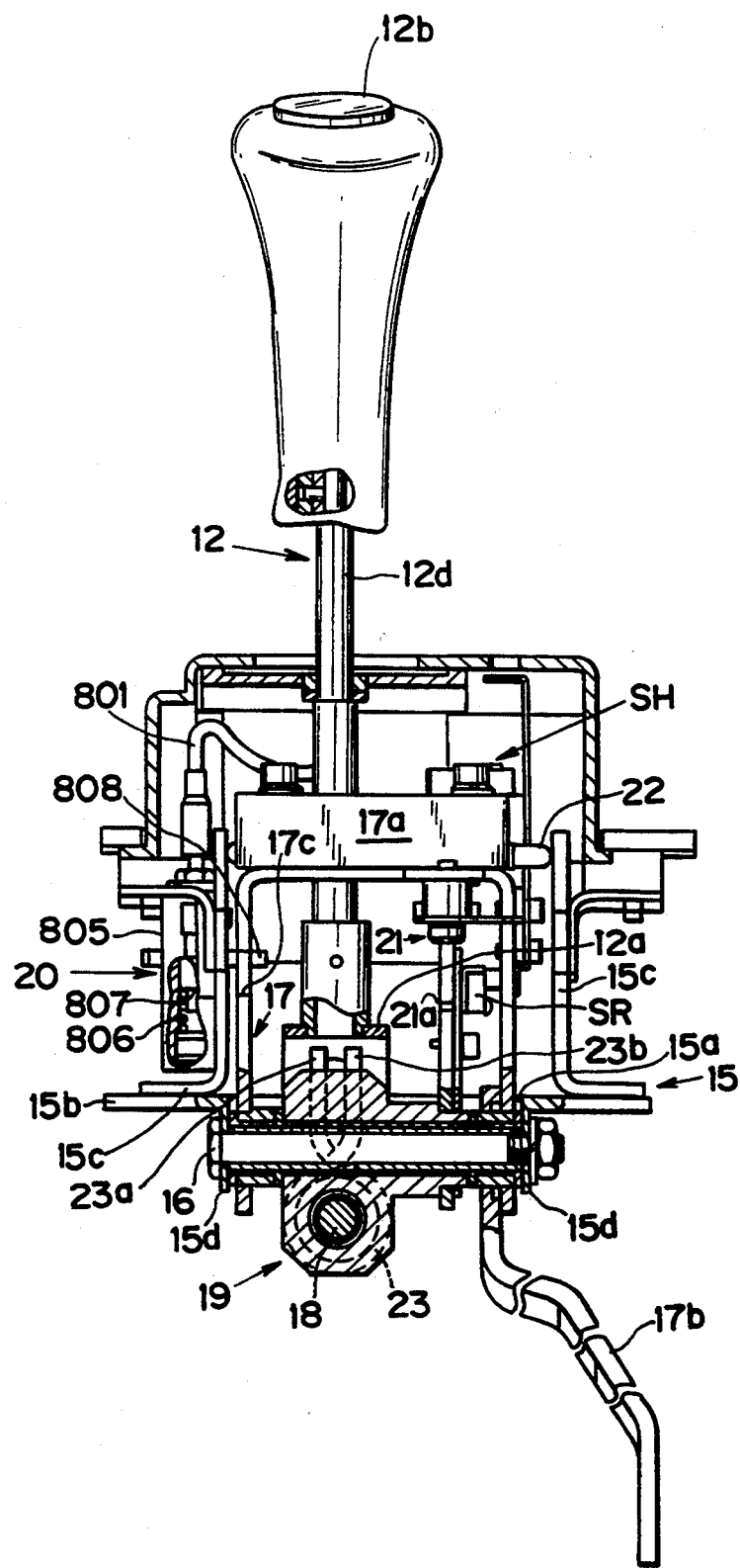
FIG. 2B is a longitudinally sectional front elevation showing the shift unit.
Figure 2C:
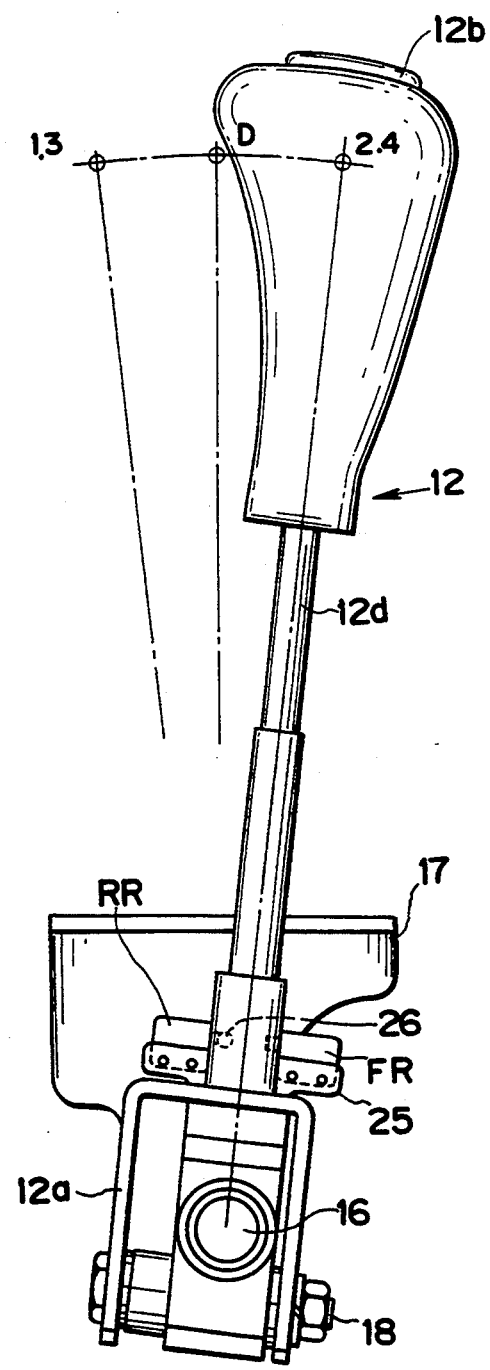
FIG. 2C is a front elevation showing a portion of the shift unit for explaining the transverse motions of a shift lever.

As shown in FIG. 2C, the remaining paired switch RR and FR are arranged to face a bracket 25 which is so fixed to have its position adjusted by a screw that it can overlap a cam plate 12a. This cam plate 21a is fixed on the cross sleeve 19 so as to construct the cam of the aforementioned detent mechanism 21. Between these switches RR and FR, moreover, there is positioned the leading end of a switch actuation pin 26 which has its base end fixed on the retainer 17. Thus, the rear switch FR attached to the bracket 25 detects the forward rocking motion of the shift lever 12, and the front switch RR detects the backward rocking motion of the same. In response to the forward and backward rocking motions and the rightward and leftward tilting motions of the shift lever 12, every two of the aforementioned four switches are turned ON/OFF. If the shift lever 12 is shifted to the first speed position, for example, the two switches FR and LH are sequentially turned ON, as shown in FIG. 5. If, on the other hand, the shift lever 12 is shifted to the fourth speed position, the two switches RH and RR are sequentially turned ON.

The aforementioned relations between the motions of the shift lever 12 and the switch operations are conceptionally illustrated in FIG. 4 and presented in a table form in FIG. 5.

Figure 6:
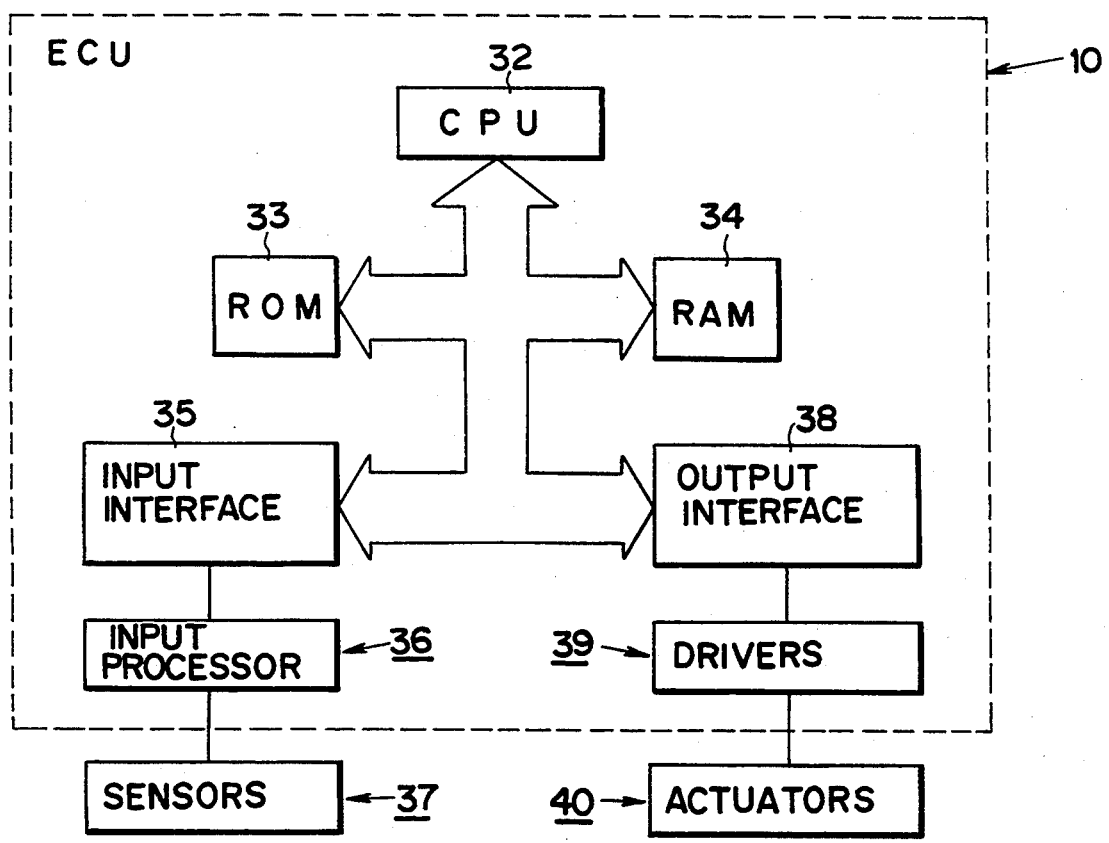
FIG. 6 is a schematic block diagram showing the control lines of an electronic control unit for an automatic transmission.

Here will be briefly described the transmission electronic control unit 10. As shown in FIG. 6, the electronic control unit 10 is constructed mainly of central processing unit (CPU) 32, a read only memory (ROM) 33, and a random access memory (RAM) 34, all of which are connected through an input interface 35 with an input processor 36. Moreover, the electronic control unit 10 is fed with signals from later-described various sensors 37 through the input processor 36. On the other hand, the CPU 32, the ROM 33 and the RAM 34 are connected through an output interface 38 with drivers 39. These drivers 39 output a drive signal to actuators 40.

Figure 7:
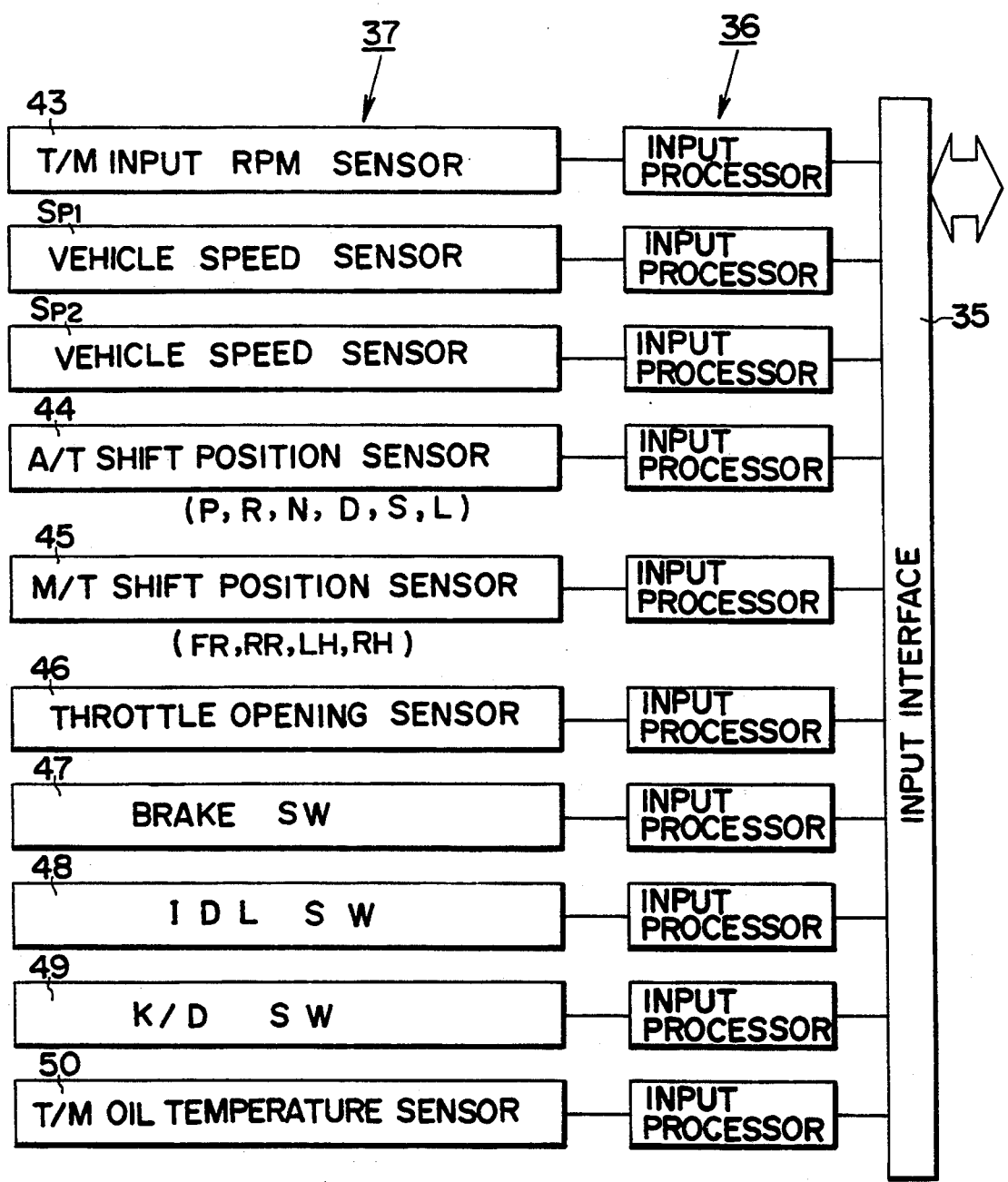
FIG. 7 is a block diagram showing sensors connected with the electronic control unit.

FIG. 7 shows a specific example of the sensors 37. Specifically, there are connected with the input processors 36 a T/M input RPM sensor 43 for detecting the input RPM to the automatic transmission 2 and first and second vehicle speed sensors $S_{p1}$ and $S_{p2}$ for detecting the vehicle speed from the RPM of the output shaft of the automatic transmission 2. There are further connected with the input processor 36 an A/T shift position sensor 44 for outputting the signals corresponding to the positions of the shift lever 12 in the aforementioned I-shaped groove 13, that is, the signals of the individual ranges including the P-range, the R-range, the N-range, the D-range, the S-range and the L-range, and an M/T shift position sensor 45, i.e., the aforementioned manual switches FR, RR, LH and RH for outputting gear stage signals in the manual shift mode in which the shift lever 12 is positioned in the H-shaped groove 14. There are additionally provides: a throttle opening sensor 46 which is arranged in the engine for detecting the degree of opening of the throttle by means of a potentiometer; a brake switch (SW) 47 which is arranged in the brake pedal for detecting the braking action; an idle (IDL) switch (SW) 48 which is arranged in the throttle opening sensor for detecting that the accelerator is fully closed; a kick-down (K/D) switch (SW) 49 which is arranged in the throttle pedal or the throttle opening sensor for detecting that the accelerator is fully opened to demand a kick-down; and a T/M oil temperature sensor 50 which is disposed in the transmission for detecting the transmission oil temperature.

Figure 8:
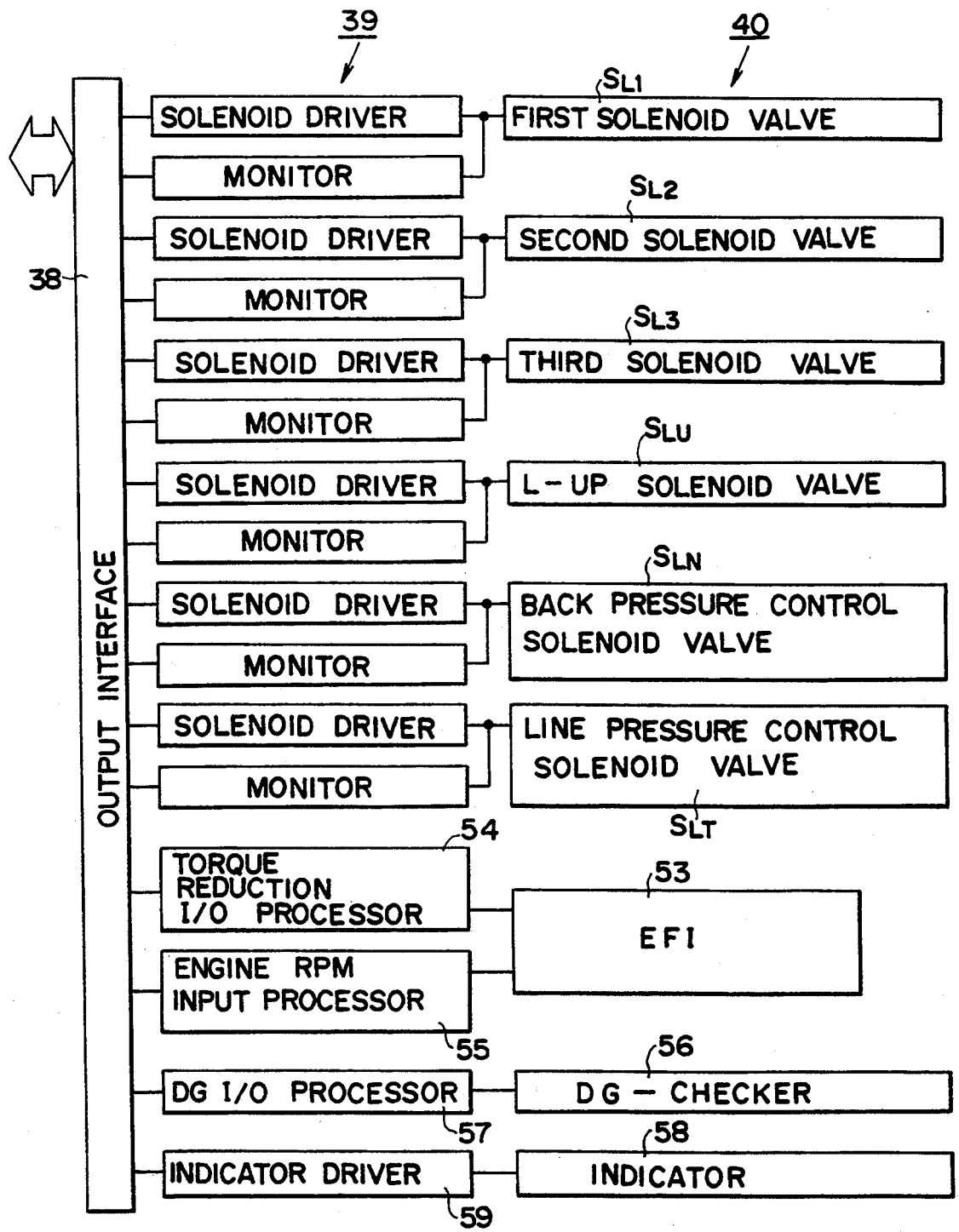
FIG. 8 is a block diagram showing actuators connected with the electronic control unit and the circuits associated therewith.

On the other hand, FIG. 8 shows circuits which are connected with the output interface circuit 38. Through solenoid drivers and monitors, individually, there are connected with the output interface 38: first to third solenoid valves $S_{L1}$, $S_{L2}$ and $S_{L3}$ for setting the individual gear stages; a linear solenoid valve $S_{LU}$ for controlling the lock-up clutch; a linear solenoid valve $S_{LN}$ for controlling the accumulator back pressure; and a linear solenoid valve $S_{LT}$ for controlling the line pressure. Here, the solenoid drivers are circuits for generating predetermined voltages or currents, and the monitors are circuits for self-diagnoses to decide failures from the operating states of the solenoids. There are further provided a torque reduction Input/output I/O processor 54 and an engine RPM processor 55 for outputting signals for the torque reduction at the shifting time to an engine control unit (EFI) 53. Further provided are: a DG I/O processor 57 for a DG-checker 56 to output the self-diagnostic result at the failure of the electronic control unit 10; and an indicator driver 59 for an indicator 58 for indicating the state of the transmission.

Figure 9:
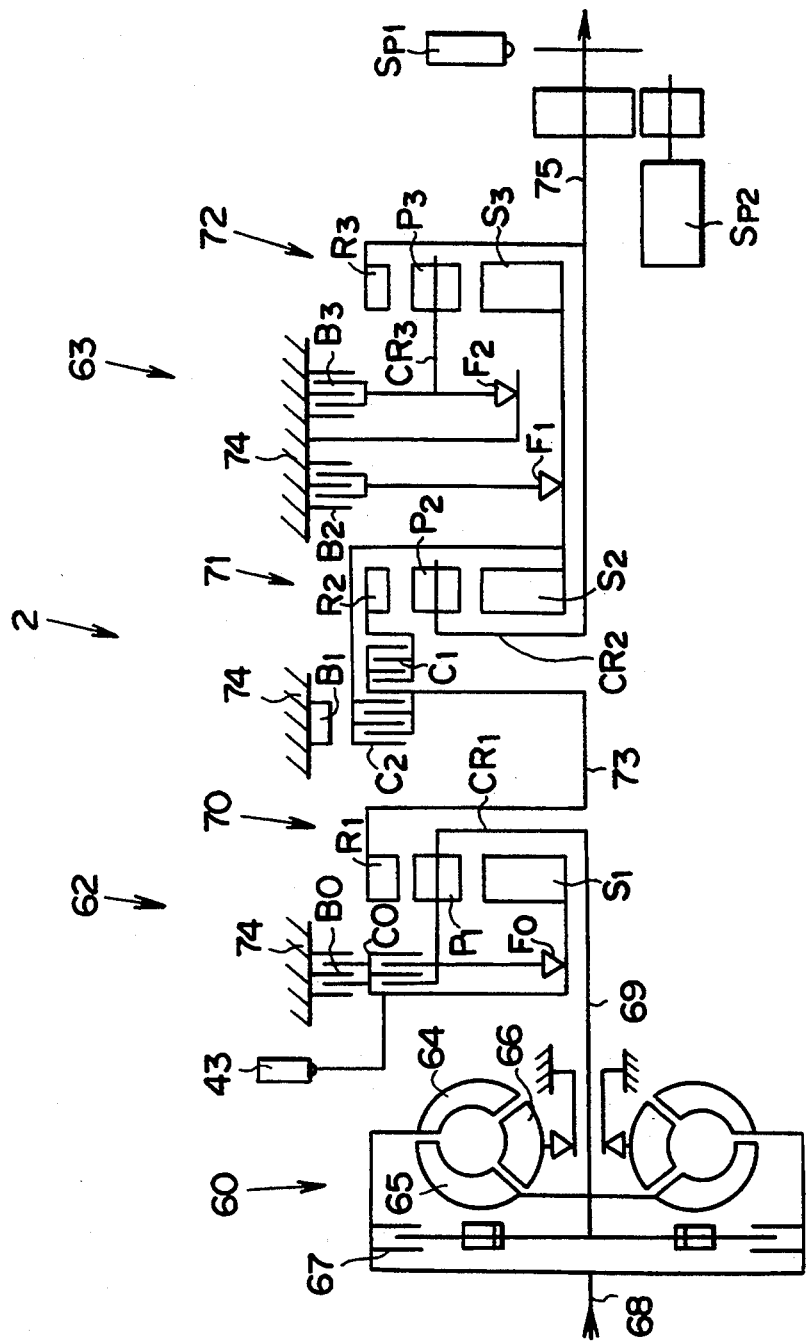
FIG. 9 is a skeleton diagram showing one example of a gear train.

The automatic transmission 2 to be controlled by the electronic control unit 10 described above is enabled to set four forward and one reverse gear stages and has its gear train exemplified in FIG. 9.

This automatic transmission 2 is equipped with a torque converter 61 for transmitting the power generated by an engine, and shift units 62 and 63 for changing the number of revolutions per minute (RPM). The torque converter 61 is composed of a pump impeller 64, a turbine runner 65, a stator 66 and a lockup clutch 67 for improving the power transmission efficiency. The revolution of an input member 68 is transmitted indirectly to the input shaft 69 of the shift unit 62 through the flow of oil in the torque converter 61 and directly to the input shaft 69 by locking the lockup clutch 67.

On the other hand, the shift units 62 and 63 constituting the gear trains of the automatic transmission 10 are auxiliary and main ones, respectively. The auxiliary shift unit 62 is composed of an overdrive planetary gear unit 70, and the main shift unit 63 is composed of a front planetary gear unit 71 and a rear planetary gear unit 72.

Here, the overdrive planetary gear unit 71 is connected to the input shaft 69 and is composed of a carrier CR1 supporting a planetary pinion P1, a sun gear S1 surrounding the input shaft 69, and a ring gear R1 connected to the input shaft 73 of the main shift unit 63. Moreover, a third clutch C0 and a third one-way clutch F0 are interposed between the carrier CR1 and the sun gear S1, and a fourth brake B0 is arranged between the sun gear S1 and a casing 74.

Next, the front planetary gear unit 71 is connected to an output shaft 75. This front planetary gear unit 71 is composed of a carrier CR2 supporting a planetary pinion P2, a sun gear S2 enclosing the output shaft 75 and integrated with the sun gear S3 of the rear planetary gear unit 72, and a ring gear R2 connected to the input shaft 73 through a first clutch C1. A second clutch C2 is interposed between the input shaft 73 and the sun gear S2, and a first brake B1 which is a band brake is interposed between the sun gear S2 and the casing 74.

The rear planetary gear unit 72 is composed of a carrier CR3 supporting a planetary pinion P3, the sun gear S3, and a ring gear R3 connected to the output shaft 75. A third brake B3 and a second one-way clutch F2 are arranged in parallel between the carrier CR3 and the casing 74. Incidentally, reference numeral 43 designates an input RPM sensor, and reference characters $S_{p1}$ and $S_{p2}$ designate vehicle speed sensors.

The oil pressure unit for controlling the automatic transmission 10 described above is equipped with three shifting solenoid valves SL1, SL2 and SL8 for setting the gear stages. These solenoid valves SL1, SL2 and SL3 are turned ON/OFF, as shown in FIG. 10, to engage/disengage the individual clutches C0, C1 and C2 and brakes B0, B1, B2 and B3 thereby to set the individual gear stages.

At the first speed in the D-range and the S-range, the first solenoid valve SL1 is turned ON. As a result, the third clutch C0 and the first clutch C1 are engaged, but the third one-way clutch F0 and the second one-way clutch F2 are locked whereas the remaining frictional engagement means are disengaged. Thus, the overdrive planetary gear unit 70 is directly connected in its entirety through the third clutch C0 and the third one-way clutch F1 so that the revolution of the input shaft 69 is transmitted as it is to the input shaft 73 of the main shift unit 63. In this main shift unit 63, on the other hand, the torque is transmitted from the input shaft 73 through the first clutch C1 to the ring gear R2 of the front planetary gear unit 71. This torque is transmitted from the ring gear R2 on one hand through the carrier CR2 to the output shaft 75 and on the other through the sun gears S2 and S3 to the carrier CR3 of the rear planetary gear unit 72. Since, however, the second one-way clutch F2 is locked to block the revolution of the carrier CR3, the planetary pinion P3 revolves on its axis so that the power is transmitted to the output shaft 75 through the ring gear R3.

At the second speed in the D-range, on the other hand, not only the first solenoid valve SL1 but also the second solenoid valve SL2 are turned ON. Then, the third clutch C0, the first clutch C1 and the second brake B2 are engaged, and the third one-way clutch F0 and the first one-way clutch F1 are locked whereas the remaining frictional engagement means are disengaged. As a result, the overdrive planetary gear unit 70 is held in its directly-connected state so that the torque is transmitted as it is from the input shaft 69 to the input shaft 73 of the main shift unit 63. In this main shift unit 63, moreover, the torque is transmitted from the input shaft 73 through the first clutch C1 to the ring gear R2 of the front planetary gear unit 71 so that the sun gear S2 receives the torque through the planetary pinion P2. However, the sun gear S2 is blocked against revolution, because the second brake B2 is engaged whereas the first one-way clutch F1 is locked. As a result, the carrier CR2 rotates while revolving the planetary pinion P2 on its axis so that the torque of the second speed is transmitted to the output shaft 75 through only the front planetary gear unit 71.

At the third speed in the D-range and the S-range, on the other hand, the first solenoid valve SL1 is turned OFF. As a result, the third clutch C0, the first clutch C1, the second clutch C2 and the second brake B2 are engaged, and the third one-way clutch F0 is locked whereas the remaining frictional engagement means are disengaged. Thus, the overdrive planetary gear unit 70 is in its directly connected state. In the main shift unit 63, on the other hand, the front planetary gear unit 71 is integrated by the engagement between the first clutch C1 and the second clutch C2 so that the torque of the input shaft 73 is transmitted as it is to the output shaft 75.

In the fourth speed, i.e., in the highest speed in the D-range, the second solenoid valve SL2 is also turned OFF so that the first clutch C1, the second clutch C2, the second brake B2 and the fourth brake B0 are engaged. The main shift unit 63 is in its directly connected state as at the third speed, but the overdrive planetary gear unit 70 is switched to have its third clutch C0 disengaged and its fourth brake B0 engaged. As a result, the sun gear S1 is locked by the engagement of the fourth brake B0, and the planetary pinion P1 revolves on its axis to transmit the power to the ring gear R1 while allowing the carrier CR2 to revolve. Thus, the input shaft 73 of the directly connected main shift unit 63 is revolved at an accelerated speed by the input shaft 69.

At the downshift of 4-3 speeds, on the other hand, the third clutch C0 is engaged, but the fourth brake B0 is disengaged. The second clutch C2 is disengaged at the shift of 3-2 speeds, and the second brake B2 is disengaged at the shift of 2-1 speeds.

The actions of the first and third speed in the S-range are similar to the aforementioned ones of the D-range. At the second speed, on the other hand, not only the first clutch C1, the third clutch C0 and the second brake B2 but also the third solenoid valve SL3 is turned ON to engage the first brake B1 thereby to lock the sun gear S2 of the main shift unit 63. As a result, the engine braking is effected.

The actions of the second speed in the L-range are similar to the aforementioned ones of the second speed in the S-range. At the first speed, on the other hand, the third solenoid valve SL3 is turned ON in addition to the first clutch C1 and the third clutch C0 to engage the third brake B3 thereby to lock the carrier CR3 of the rear planetary gear unit 72. Thus, the engine braking is effected.

Moreover, the third and fourth speeds in the manual shift mode are set as in the aforementioned automatic shift mode. The second speed is set like the second speed in the S-range, and the first speed is set like the first speed In the L-range.

As has been described hereinbefore, the shift unit 11 is constructed to change the shift mode to the manual one by having its shift lever 12 moved from the D-range position into the H-shaped groove 14. Since the manual valve to be actuated by the shift unit 11 is left in the state for setting the D-range, there is provided an oil pressure circuit, as will be described hereinafter, for effecting the engine braking even at the first and second speeds even in this state.

Figure 11:
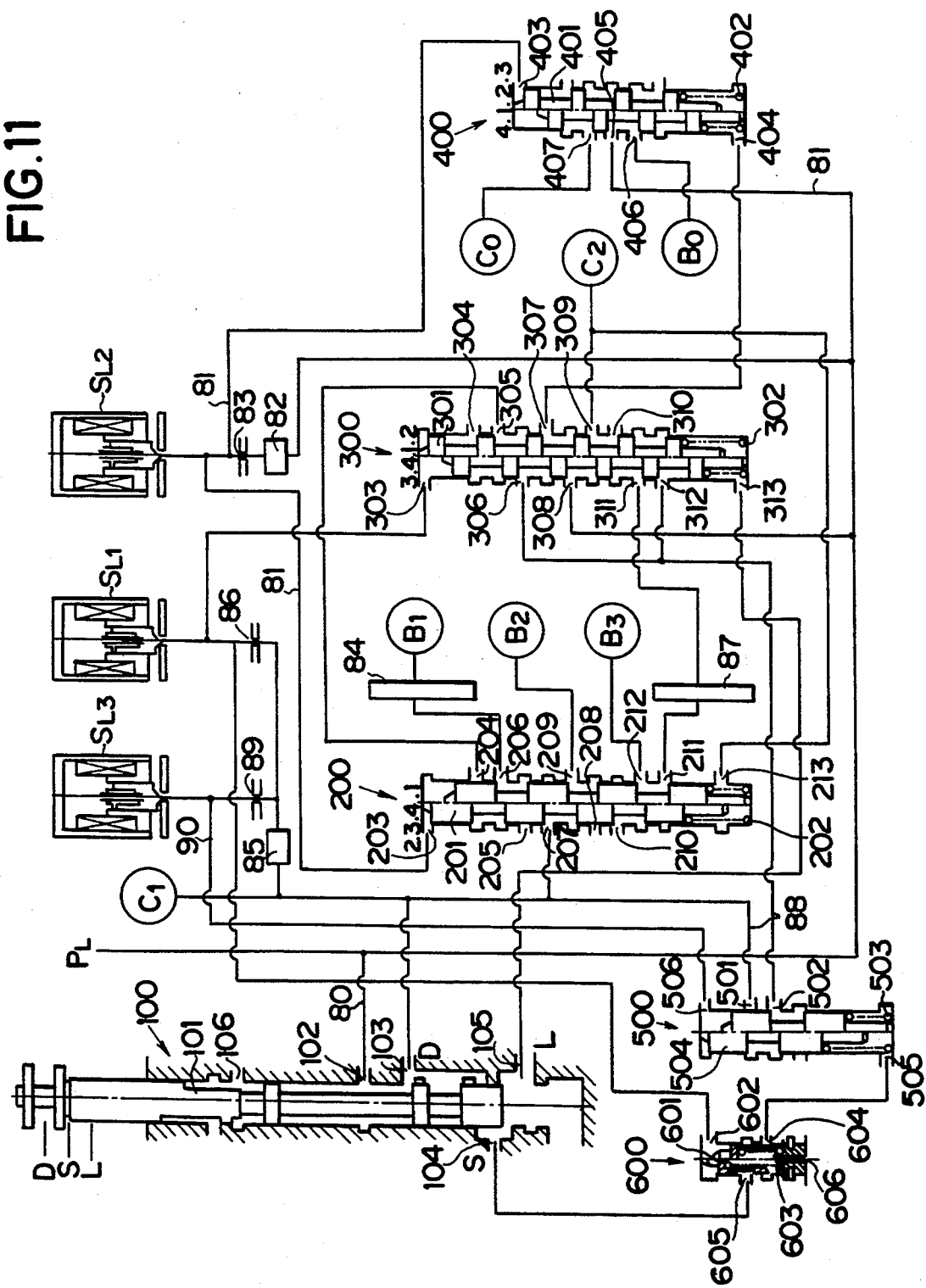
FIG. 11 is a diagram showing a main circuit portion of a hydraulic control system.

In FIG. 11, a manual valve 100 switches the pumping state of the oil pressure by manipulating the aforementioned shift lever 12 to move a spool 101. A line pressure line 80 is provided for feeding a line pressure PL regulated by a (not-shown) primary regulator valve and is connected to an input port 102. In the D-range, the spool 101 takes the shown position to open the input port 102 to a D-port 103. In the S-range, on the other hand, the spool 101 is moved downward of the drawing to open the input port 102 to the D-port 103 and an S-port 104. In the L-range, the spool 101 is further moved downward to open the input port 102 to the three ports, i.e., the D-port 103, the S-port 104 and an L-port 105. In the N-range, on the other contrary, the spool 101 closes the input port 102. In the R-range, the input port 102 is opened to an R-port 106. In the P-range, the input port 102 is closed whereas the remaining ports are opened to the drain port.

A 1-2 shift valve 200 for effecting a shift between the first and second speeds is equipped with a spool 201 having four lands and a spring 202 arranged at one end of the spool 201. The end portion opposed to the spring 202 is formed with a control port 203 which is connected to the second solenoid valve $S_{L2}$. When this solenoid valve $S_{L2}$ is OFF, the line pressure $P_L$ to be fed from a line pressure line 81 through a strainer 82 and an orifice 83 is established in the control port 203.

The 1-2 shift valve 200 is sequentially formed below the control port 203 with a second coast port 204 to be opened or closed by the uppermost land, and a first brake port 206 to be selectively opened to the second coast port 204 and a drain port 205. The first brake B1 is connected to the first brake port 206 through a second coast modulator valve 84. Below the drain port 205, there is further formed a D-port 207 which is connected to the D-port 103 of the manual valve 100. The second brake B2 is connected to a second brake port 209 which is selectively opened to that D-port 207 and another drain port 208. Below this drain port 208, there is further formed still another drain port 210. The third brake B3 is connected to a third brake port 212 which is selectively opened to the drain port 210 and a low coast port 211. Moreover, a hold port 213 is formed in the lowermost end portion in which is arranged the spring 202.

A 2-3 shift valve 300 for effecting a shift between the second and third speeds is equipped with a spool 301 having six lands and a spring 302 arranged at its one end portion (i.e., at the lower end portion of the drawing). The first solenoid valve $S_{L1}$ is connected to a control port 303 which is formed at the end portion opposed to the spring 302. When the first solenoid valve $S_{L1}$ is OFF, the line pressure $P_L$ to be fed from the D-port 103 of the aforementioned manual valve 100 through a strainer 85 and an orifice 86 is established in the control port 303.

This 2-3 shift valve 300 is formed sequentially downward with a first drain port 304, a brake port 305 and a first D-port 306. The brake port 305 is connected to the second coast port 204 of the aforementioned 1-2 shift valve 200 and is selectively opened to the first drain port 304 and the first D-port 306. The 2-3 shift valve 300 is further formed sequentially with a hold output port 307, an input port 308, a clutch port 309 and a second drain port 310. When the first drain port 304 and the brake port 305 are opened to each other, communications are provided between the first D-port 306 and the hold output port 307 and between the input port 308 and the clutch port 309. When the brake port 305 is opened to the first D-port 306, communications are provided between the hold output port 307 and the input port 308 and between the clutch port 309 and the second drain port 310.

Subsequent to the second drain port 310, there are further formed a brake port 311 and a second D-port 312. When the clutch port 309 is opened to the input port 308, the second drain port 310 is opened to the brake port 311. On the other hand, when the clutch port 309 is opened to the second drain port 310, communication is provided between the brake port 311 and the second D-port 312. Moreover, a hold port 313 is formed at the lowermost end portion in which is arranged the spring 302.

The second clutch C2 is connected to the aforementioned clutch port 309, which is connected to the hold port 213 of the aforementioned 1-2 shift valve 200. The brake port 311 is connected through a low coast modulator valve 87 to the low coast port 211 of the 1-2 shift valve 200. Moreover, the hold port 313 is connected to the L-port 105 of the manual valve 100 so that the spool 301 is held in a raised position, as shown at the righthand half of the drawings, in the L-range.

A 3-4 shift valve 400 is controlled by the oil pressure, which Is fed from the second solenoid valve S2 and the hold output port 307 of the 2-3 shift valve 300, to execute the shifting action of the aforementioned auxiliary shift unit 62. The 3-4 shift valve 400 is equipped with a spool 401 having four lands and a spring arranged at one end portion of the spool 401. A control port 403 is formed at the end portion opposed to the spring 402 and is connected to the second solenoid valve $S_{L2}$ like the control port 203 of the 1-2 shift valve 200. Moreover, a hold port 404 is formed at the end portion, in which is arranged the spring 402, and is connected to the hold output port 307 in the 2-3 shift valve 300.

In the 3-4 shift valve 400 thus constructed, an input port 405 connected with the line pressure line 81 is opened to a brake port 406 which is connected to a brake B0, when the second solenoid valve S2 is OFF so that the line pressure $P_L$ is applied to the control port 403. On the other hand, when the control port 403 is released or when the hold port 404 receives the oil pressure, the input port 405 is opened to a clutch port 407 which is connected to the clutch CO.

To the port 103 of the manual valve 100, there is connected the first clutch C1. Midway of an oil line 88 leading from this first clutch C1 to the first and second D-ports 306 and 312 of the 2-3 shift valve 300, there is disposed a coast brake cut-off valve 500 for effecting the engine braking at the first and second speeds in the manual shift mode, that is, for inhibiting the engine braking at the first and second speeds in the automatic shift mode.

This coast brake cut-off valve 500 is given an action to establish selective communication between a clutch port 501 connected to the first clutch C1 and a brake port 502 connected to the first and second D-ports 306 and 312 of the 2-3 shift valve 300. The cut-off valve 500 is equipped with a spring 504 which is urged in one direction by a spring 503. A hold port 505 formed at the end portion arranged with the spring 503 is connected through an overdrive (O/D) lockout valve 600 to the S-port 104 of the manual valve 100. A control port 506 formed at the opposite end portion is connected to the third solenoid valve $S_{L3}$. This third solenoid valve $S_{L3}$ is disposed in an oil line 90, which connects the first clutch C1 and the control port 506 through the strainer 85 and an orifice 89. Thus, the third solenoid valve $S_{L3}$ closes its drain port, when turned OFF, to establish the line pressure $P_L$ in the control port 506 and, when turned ON, to open its drain port to release the control port 506.

The O/D lockout valve 600 has its valve member 601 positioned by both the line pressure $P_L$ to be acting in a control port 602 and the action of a spring 603 against the control pressure, thereby to open its output port 604 selectively to its input port 605 and drain port 606. Specifically, the valve member 601 has its intermediate portion radially reduced from its two end portions. As a result, the output port 604 and the input port 605 are opened to each other through the clearance around the outer circumference of the valve member 601 while the valve member 601 is pushed down compressing the spring 603. On the other hand, while the valve member 601 is pushed up to the position, as shown in the lefthand half of FIG. 11, it closes the input port 605 and opens the output port 604 to the drain port 606.

Moreover, the hold port 505 of the coast brake cut-off valve 500 is connected to the output port 604. The input port 605 is connected to the S-port 104 of the manual valve 100, and the control port 602 is connected with the first solenoid valve $S_{L1}$.

The aforementioned individual solenoid valves $S_{L1}$, $S_{L2}$ and $S_{L3}$ are turned ON or OFF, as tabulated in FIG. 10. In the 1-2 shift valve 200, therefore, the spool 201 is pushed down at the first speed, as indicated at the righthand half of the drawing, but is pushed up at the remaining forward speeds, as indicated at the lefthand half. In the 2-3 shift valve 300, moreover, the spool 301 is pushed up at the first and second speeds, as indicated at the righthand half of the drawing, and is pushed down at the third and fourth speeds, as indicated at the lefthand half. In the 3-4 shift valve 400, still moreover, the spool 401 is pushed up at the first to third speeds, as indicated at the righthand half of the drawings, and is pushed down at the fourth speed, as indicated at the lefthand half. As a result, the individual frictional engage means are engaged or disengaged, as tabulated In FIG. 10, to set the individual gear stages.

Here will be described especially the first and second speed in the manual shift mode. When these gear stages are to be set, the third solenoid valve $S_{L3}$ is turned ON, and the coast brake cut-off valve 500 is released from its control port 506 so that its spring 504 is pushed up to the position, as indicated at the lefthand half of the drawing, by the spring 503. As a result, the clutch port 501 and the brake port 502 are opened to each other so that the line pressure $P_L$ is fed to the first D-port 306 and the second D-port 312 of the 2-3 shift valve 300. On the other hand, when the first and second speeds are set, this 2-3 shift valve 300 is released from its control port 303 because the first solenoid valve $S_{L1}$ is turned ON. Accordingly, the spool 301 is pushed up to the position, as indicated at the righthand half of the drawing so that the first D-port 306 is opened to the brake port 305 whereas the second D-port 312 is opened to the brake port 311. In other words, the line pressure $P_L$ is fed to the second coast port 204 and the low coast port 211 of the 1-2 shift valve 200, which are respectively connected to those brake ports 305 and 311.

In this 1-2 shift valve 200, the second solenoid valve $S_{L2}$ is turned OFF at the first speed, and the oil pressure is fed to the control port 203 so that the spool 201 is pushed down to the position, as indicated at the righthand half of the drawing, to open the low coast port 211 to the third brake port 212. As a result, the third brake 33 connected to the third brake port 212 is engaged by the oil pressure fed thereto. In the gear train shown in FIG. 9, the third brake B3 arranged in parallel with the second one-way clutch F2 is engaged to inhibit either the forward or backward rotation of the carrier P3 so that the engine braking can be effected.

Moreover, the second solenoid valve $S_{L2}$ is turned ON at the second speed so that the 1-2 shift valve 200 is released from its control port 203 to have its spool 201 pushed up to the position, as indicated at the lefthand side of the drawing. As a result, the second coast port 204 is opened to the first brake port 206 so that the first brake B1 connected to the first brake port 206 is engaged. In the gear train shown in FIG. 9, the first brake B1 arranged in parallel with the first one-way clutch F1 and the second brake B2 is engaged to inhibit either the forward or backward rotation of the sun gears S2 or S3 in the main shift unit 63 so that the engine braking can be effected.

Figure 12:
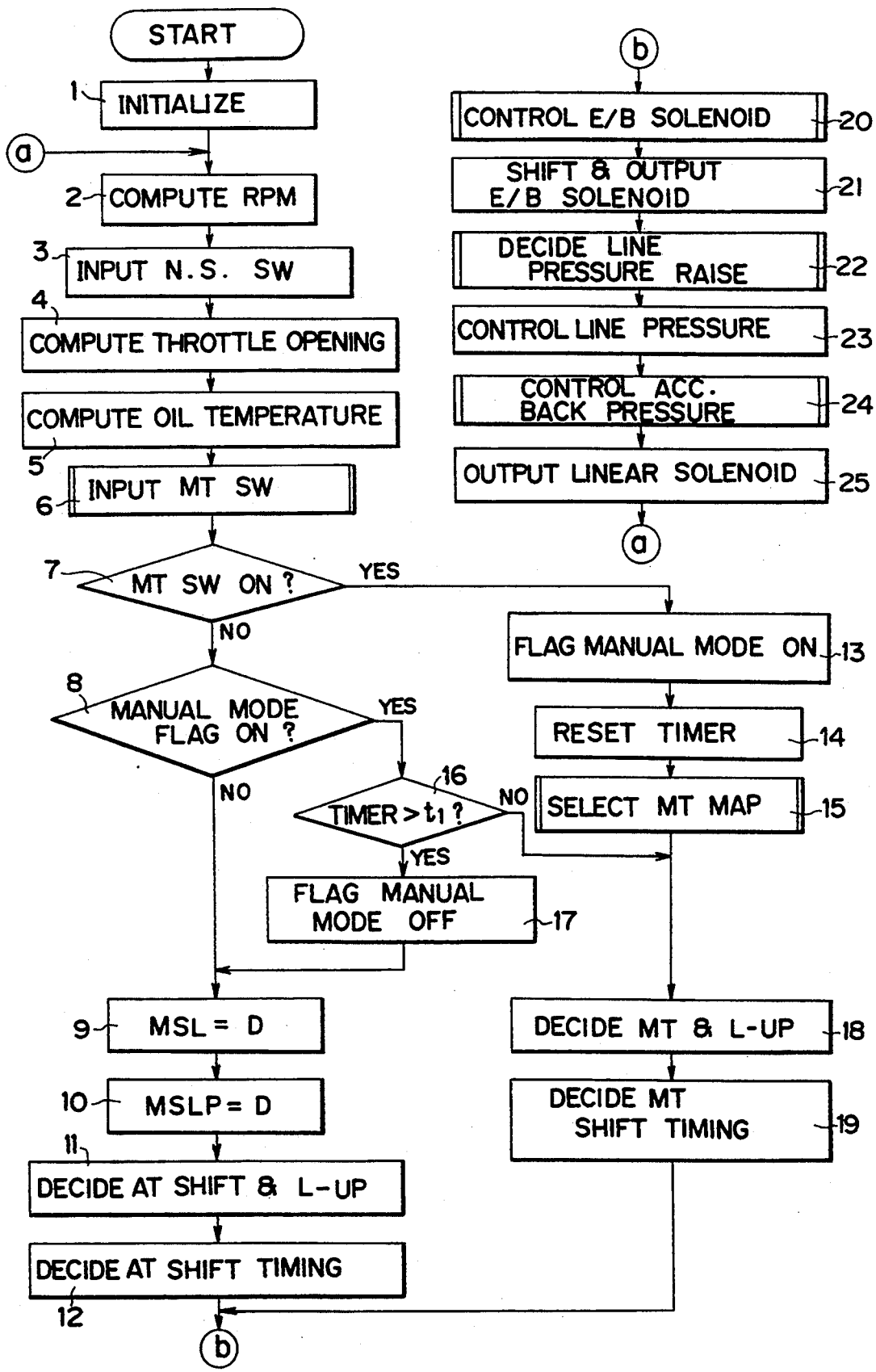
FIG. 12 is a general flow chart for switching the automatic shift mode and the manual shift mode.

Here will be described a control for switching the automatic shift mode and the manual shift mode. FIG. 12 is a general flow chart for selecting the shift modes by the electronic control unit 10.

First of all, at Step 1, all conditions are initialized at the start of the program. Next, at Step 2, the signals coming from the T/M input RPM sensor and the vehicle speed sensor ($S_{p1}$ and $S_{p2}$) are used to compute the present RPMs of the T/M input shaft and output shaft. At Step 3, the signal of the A/T shift position sensor (or neutral start switch) is used to detect the range position which is selected at present in the automatic shift mode. Simultaneously with this, the failure of the neutral start switch is decided. At Step 4, the signal of the throttle opening sensor is used to compute the present throttle opening. At Step 5, the signal of the T/M oil temperature sensor is used to compute the present T/M oil temperature (or ATF temperature).

At Step 6, the signals of the M/T shift position sensors are used to decide the shift position. In the subroutine of this Inputting the MT switch, the M/T shift position sensors, i.e., the individual switches LH, RH, FR and RR are combined to turn ON any of the MT shift position flags $F_{S1}$ to $F_{S4}$. If all the switches are OFF, all the MT shift position flags $F_{S1}$ to $F_{S4}$ are turned OFF.

Next, at Step 7, it is decided whether any of the MT shift position flags $F_{S1}$ to $F_{S4}$ is ON. At Step 8, it is decided whether the MT mode flag is ON (that is, whether the manual shift mode is selected). At Step 9, AT shifting data D are read in shift diagram data MSL. At Step 10, L-up data D for AT are read in lockup (L-up) diagram data MSLP. At Step 11, the shift and L-up are decided on the basis of the data read at Steps 9 and 10 and the various conditions computed previously. At Step 12, the timing for the shift and L-up decided at Step 11 is decided.

At Step 13, on the other hand, the MT mode flag is turned ON to effect the manual shift mode selected state. At Step 14, the value of an AT mode returning timer is reset. At Step 15, the routine enters a subroutine for reading various data for the MT mode. At Step 16, the value of the AT mode returning timer and a set value $t_1$ are compared. At Step 17, the MT mode flag is turned OFF if the condition of Step 16 is satisfied, and the subroutine returns to the At shift mode. At Step 18, the shift and L-up are decided on the basis of the data read in the MT map select subroutine and the various conditions computed previously. At Step 19, the timing of the shift and L-up decided at Step 18 is decided. At Step 20, the engine brake solenoid $S_{L3}$ is controlled and decided in terms of the manual shift position and the output required gear stage. At Step 21, the signals are outputted to the individual solenoids ($S_{L1}$ to $S_{L3}$) to start the shift in accordance with the decisions of Steps 11 and 12 or Steps 18, 19 and 20.

Step 22 is a subroutine for deciding the line pressure false temporarily to shorten the time lag in the MT mode. At Step 23, the line pressure is controlled according to the throttle opening and is raised according to the decision of Step 22. Step 24 is a subroutine for controlling the accumulator back pressure differently for the AT mode and the MT mode so as to reduce the shock in the transition of the shift. At Step 25, the individual linear solenoids $S_{LU}$, $S_{LN}$ and $S_{LT}$ are controlled according to the decisions of Steps 11 and 12 or Steps 18 and 19.

Figure 13A:
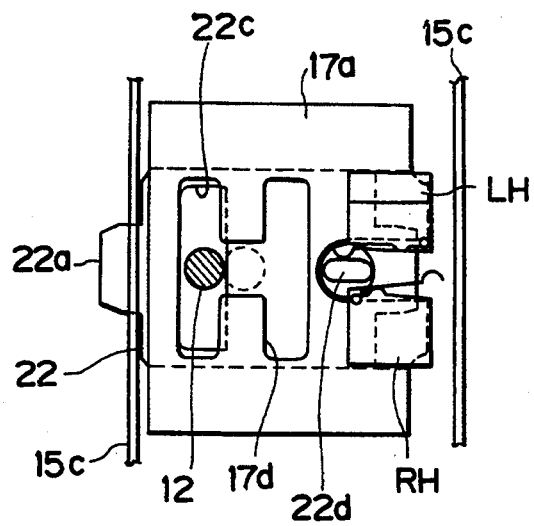
FIGS. 13A, 13B and 13C are top plan views showing a portion of unit for explaining the operations of a mechanism for detecting the transverse positions of the shift lever.
Figure 13B:
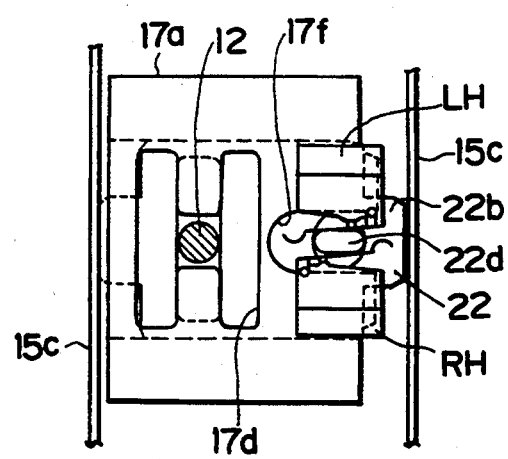

Here will be described the operations of all including the shift unit 11. As described hereinbefore, the shift lever 12 can be rocked back and forth between the range positions P, R, N, D, S and L as in the automatic shifting operations of the prior art in a non-tilted position. Since, in this state, the shift lever 12 and the gate plate 22d are longitudinally engaged in the central junction of the H-shaped gate hole 17d, the retainer 17 is rocked together with the shift lever 12 so that the shift lever can be shifted to any of the range positions P, R, N, D, S and L. In this meanwhile, the rightward and leftward tilting motions of the shift lever 12 are prevented by the abutting slide between the ears 22a and 22b of the lock plate 22 and the side plates 15c, as shown in FIG. 13B. As a result, the manual valve connect member 17b rocks back and forth on the transverse pin 16 to push forward the control rod connected to the lower end thereof. This rod is retracted by the rocking motions of the outer lever, the manual shaft and the detent lever of the automatic transmission in the same direction so that the manual valve 100 is switched to change the range pressure of the hydraulic control circuit shown in FIG. 11. On the other hand, the rocking motion of the manual shaft is detected by the AT shift position sensor (or the neutral start switch) and is inputted to and arithmetically operated by the electronic control unit (ECU) 10 so that the individual solenoid valves $S_{L1}$ to $S_{L3}$ shown in FIG. 11 are turned ON/-OFF. These operations are not especially different from the shifting operations of the automatic transmission of the prior art.

When the shift lever 12 reaches the D-range position, the ears 22a and 22b of the lock plate 22 come into alignment with the holes 15e formed in the side plates 15c so that the prevention of the rightward and leftward sliding motions by the lock plate 22 can be released to allow the rightward and leftward tilting motions of the shift lever 12. In order to select the first speed in the D-range position of the shift lever 12, this lever 12 is fallen leftward and then pushed forward. By this leftward fall, the ear 22a of the lock plate 22 comes into engagement with the hole 15e of the side plate 15c so that the retainer 17 1s restricted in its forward and backward rocking motions while leaving the shift lever 12 unrestricted. At the time of this operation, the boss 22d of the lock plate 22 turns ON the switch LH. Next, in the forward pushing action, the shift lever 12 is moved forward along the engage hole 22c of the lock plate 22, as shown in FIG. 13A, to turn ON the switch FR, as shown in FIG. 4A. As a result of these two motions, the switches LH and FR are sequentially turned ON. In response to the inputs from these switches, the electronic control unit (ECU) 10 operates the signals to output a first speed signal to turn ON the solenoid valves $S_{L1}$ to $S_{L3}$ so that the automatic transmission 2 may achieve the first speed. On the other hand, the manual valve connect member 17b is not moved because the retainer is restricted on the stationary member 15, so that the manual valve 100 is not switched through the control rod.

Figure 13C:
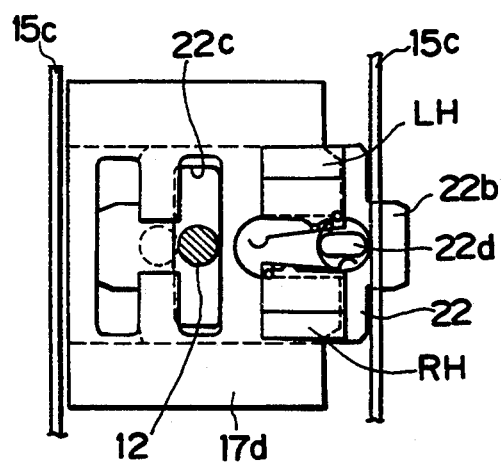

Likewise, in order to select the second speed, the shift lever 12 is fallen leftward in the D-range position and is then pulled backward (as shown in FIG. 14C). The operation of the switch LH in this action is similar to the aforementioned one of the first speed, and the switch RR is then turned ON. By these two actions, the second speed is discriminated. Since, in this case, the manual valve connect member 17b is not moved by a similar reason, the manual valve 100 is not switched. The selection of the third speed Is effected by a motion which is symmetric to the aforementioned one of the second speed with respect to the D-range position, and the shift lever 12 is fallen rightward (as shown in FIG. 13C) from the D-range position and then pushed forward (as shown in FIG. 14A). The actions and functions of the individual members at this time are apparent from the description thus far made, and their description will be omitted. The third speed is discriminated in terms of the ON states of the switches RH and FR. On the other hand, the selection of the fourth speed is effected by the motion which is symmetric to that of the first speed with respect to the D-range position. The shift signals thus obtained are operated in the electronic control unit (ECU), as described above, and are used to control the shifting solenoid valves $S_{L1}$ to $S_{L3}$.

In the system of this embodiment as has been described hereinbefore, the gear stages of the first to fourth speeds are not determined without the ON operations of the two switches, as enumerated in the manual switch signal table of FIG. 5. Thus, the system is advantageous in that the failure of the short-circuit of any of the switches will not directly lead to incapability of achieving the D-range.

Incidentally, the shift control system of the present invention is intrinsically featured in that it is kept away from having its three switches simultaneously turned ON. Thus, the failure of the short-circuit of the switches can be decided by making use of this feature, in case the switch RR is short-circuited so that the third speed position is selected to turn ON the switches RH and FR, as seen from the manual switch signal table of FIG. 5, it is possible to effect a switching to the D-range control. In this case, the higher gear stage or the fourth speed of the two probable gear stages of the third and fourth speeds can be selected, as different from the tabulated control, to achieve the gear stage close to the will of the driver while leaving the shift in the manual mode.

Moreover, the ON of the switch LH or RH for detecting the tilting motion of the shift lever never falls to precede the ON of the switch FR or RR for detecting the rocking motion so that the failure of the short-circuit of the switch can be presumed by monitoring that sequence. If the third speed is selected with the switch RR being failed for short-circuit, for example, the sequence of the switching operations is in the order of the switch RR ON, the switch RH ON and the switch FR ON. The correct operations in this case can be deemed to include the ON of the switch RH and the subsequent ON of the switch FR. Thus, it is decided that the third speed position is selected. If, in this case, the switch FR is left OFF even after a predetermined time has elapsed after the ON of the switch RH, it is decided that the fourth speed, at which the switch RR failed to short-circuit should be ON, is selected.

In addition to the aforementioned counter-measures for the failure, according to the present invention the time period for the shift-up from the second speed to the third speed can be shortened by making use of the fact that the detection of the shift lever position and the accuracy of the position location are enhanced. Specifically, when the switch RH is turned ON after the OFF of the switch RR, the OFF of the switch LH and the D-range position signal, it is decided that the driver has a will to shift up, and the shift to the third-speed gear is started.

Moreover, the time period for returning to the D-range can also be shortened by making use of the aforementioned feature. Specifically, it is difficult to decide whether the return of the shift lever to the D-range position is the transition from the second to third speed or the selection of the D-range position. Therefore, the timer is set to such a slightly longer value as to prevent a disadvantage that the D-range position is decided in the transitional state to temporarily return to the automatic shift mode. The longer setting in turn invites a time lag in the return to the automatic shift mode. However, the aforementioned tracking of the switch operating sequence is shortened the time period required for deciding the position selection so that the time period for setting the timer can be shortened to reduce the time lag.

Figure 15:
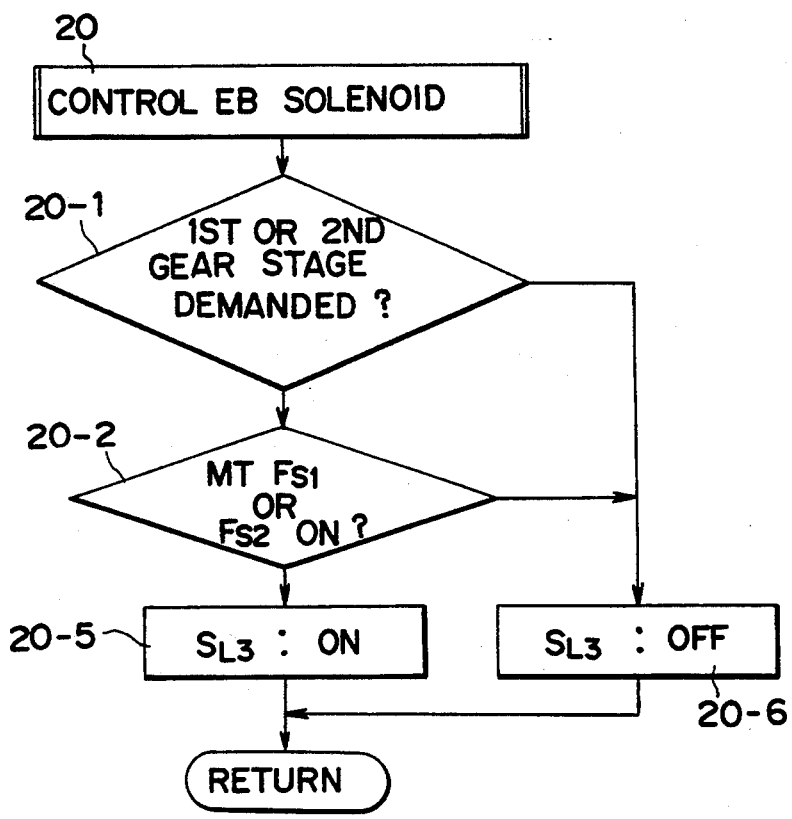
FIG. 15 is a flow chart showing a subroutine for controlling an engine braking solenoid valve.

Incidentally, the vehicular automatic transmission generally smoothens the shift by keeping the one-way clutch engaged at intermediate or low gear stages. This applies to the automatic transmission shown in FIG. 9, and the first and second speeds in the automatic transmission mode are set by engaging the one-way clutch, in the manual shift mode, on the other hand, the engine braking has to be effected at all the gear stages. At the first and second speeds in the manual mode, therefore, the engine braking is effected by actuating the third solenoid valve $S_{L3}$ while leaving the manual valve 100 unswitched. FIG. 15 is a flow chart showing a control routine therefor, and this control is executed at Step 20 shown in FIG. 12.

In FIG. 15, at Step 20-1, it is decided from the shift decisions of Steps 12 and 18 whether the gear stage demanded is at the first or second speed. At Step 20-2, it is decided whether the 1St or 2ND of the shift position is selected. If the foregoing two conditions are satisfied, it is decided at Step 20-5 that the third solenoid valve $S_{L3}$ should be turned ON. If the answer of Step 20-1 is NO, it is decided at Step 20-6 that the third solenoid valve $S_{L3}$ a should be turned OFF.

Figure 16:
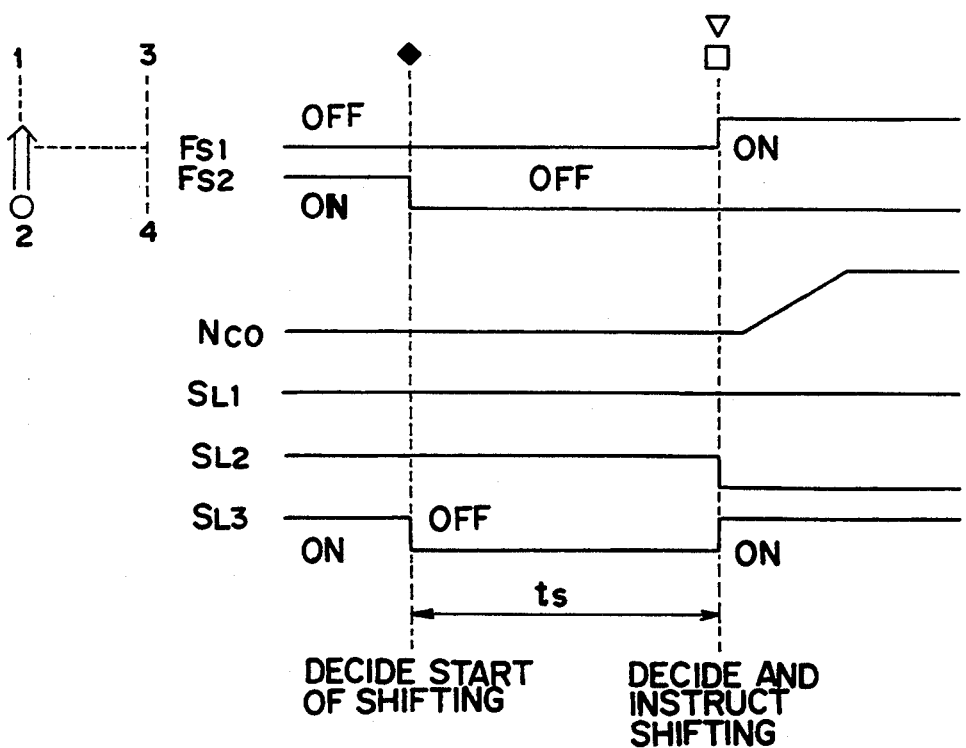
FIG. 16 is a time chart showing the output timing of a signal for instructing a gear stage and the timing of the ON/OFF operations of a shifting solenoid valve.

In the shift control system described above, the signals are operated such that the individual MT shift position flags $F_{S1}$ to $F_{S4}$ are turned ON in response to the ON of the switch LH or RH and the switch FR or RR. In response to the OFF of the switch FR or RR, it is decided at Step 20-6 that the third solenoid valve $S_{L3}$ should be turned OFF. Therefore, as shown as the 2-1 shiftdown time chart representing the shifting operation in FIG. 16, the shift position flag $F_{S2}$ is ON when the shift lever 12 is in the 2ND position. Even if the switch LH is turned ON when the shift lever 12 leaves the 2ND position, the shift position flag $F_{S2}$ is turned OFF in response to the OFF of the switch RR so that the third solenoid valve $S_{L3}$ is turned OFF simultaneously with the start of the shifting operation. After this, the switch FR is turned ON after a required time period ts for the shifting operation, and the manual shifting shift point data MSL=1 are set in the subroutine of selecting the MT map by deciding the shift position flag $F_{S1}$. In case the vehicle speed fails to exceed a predetermined value, it is decided that the gear stage demanded is at the first speed, and the third solenoid valve $S_{L3}$ is turned ON.

Thus, the brake B1 Is disengaged when the shift lever 12 leaves the 2ND position, and the brake B3 is engaged when the shift lever 12 comes to the 1ST position. Thus, the shift response can be improved better than the shift control which is started when the 1St position is taken. Even if, on the other hand, the brake B1 is disengaged when the shift lever 12 leaves the 2ND position in the power-ON state, the second-speed gear stage can be maintained by the action of the one-way clutch so that the abrupt rise in the engine RPM can be prevented. Incidentally, the controls similar to the aforementioned one are likewise accomplished for the individual upshifts of 1-2, 1-3, 1-4, 2-3 and 2-4.

Figure 17:
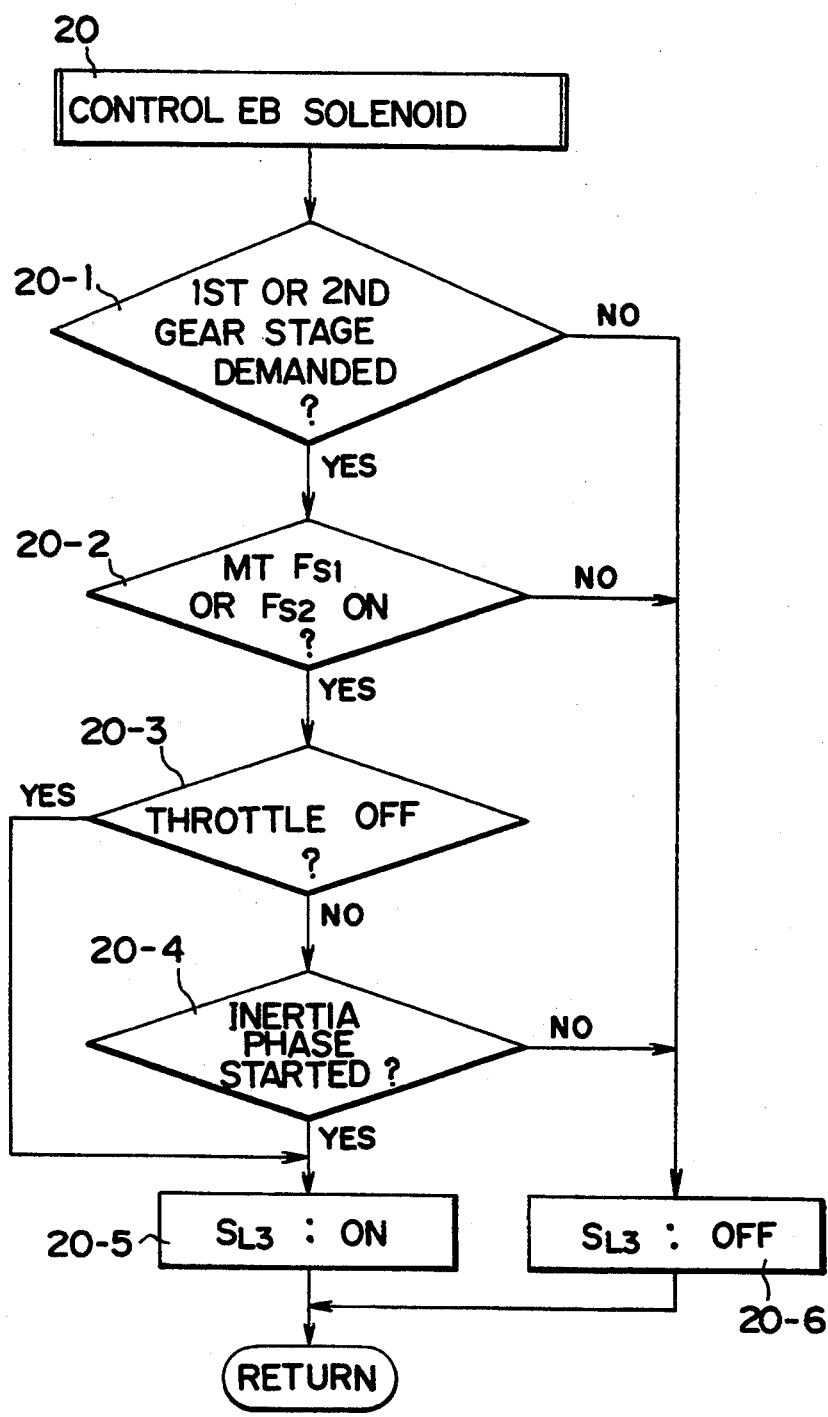
FIG. 17 is a flow chart showing another subroutine for controlling the engine braking solenoid valve.

Moreover, only the controls are not sufficient at the time of the manual shiftdown (e.g., 2-1 or 3-2). At the time of the shiftdown 2-1, for example, the pressure of the first brake B1 raises no problem because it is prematurely released by the aforementioned controls. However, the application of the oil pressure to the third brake B3 or the second brake B2 has to be interchanged, and it is difficult to time this interchange. Especially, these two brakes are liable to tie up when the throttle has a high degree of opening to have an engage pressure raised. At the time of a power-ON shift, therefore, the engagement of the third brake B3 has to be delayed till the oil pressure of the second brake B2 starts to be released. FIG. 17 is a control flow in which Steps 20-3 and 20-4 capable of performing such measures are incorporated into the subroutine 20 for controlling the engine brake solenoid.

Figure 18:
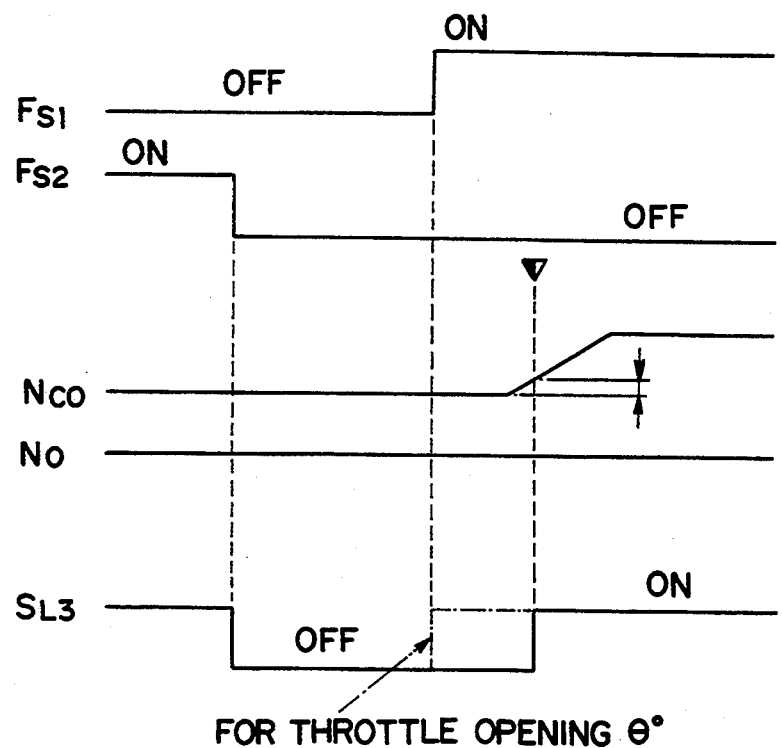
FIG. 18 is a time chart showing the output timing of a signal for Instructing a gear stage by the subroutine shown in FIG. 17 and the timing of the ON/OFF operations of a shifting solenoid valve.

In this control, at Step 20-1, it is decided from the shift decisions of Steps 12 and 18 whether the gear stage demanded is at the first or second speed. At Step 20-2, it Is decided whether the shift position 1 or 2 is selected. At Step 20-3, it is decided that the throttle is OFF, if the throttle opening inputted at present is nor more than 3 %. At Step 20-4, the start of an inertia phase is decided at the shift transition by comparing the input RPM and output RPM of the transmission. At Step 20-5, it is decided that the third solenoid valve $S_{L3}$ is ON, if the answers of all Steps 20-1 to 20-3 or Steps 20-1. 20-2 and 20-4 are YES. If the answers are NO, it is decided at Step 20-6 that the third solenoid valve $S_{L3}$ is OFF. Thus, by detecting the input RPM and output RPM of the transmission, the start of the inertia phase (i.e., the start of disengaging the second brake B2) is detected to delay the engagement of the third brake B3 till the detection. At this time, no time lag is established because the first speed is maintained by the one-way clutch F2. The time chart of this case is shown in FIG. 18.

The shift unit used in the shift control system of the present invention is arranged with the first to fourth gear stage positions for selecting the gear stages in the manual shift mode such that they take the It-shaped arrangement around the D-range position, as shown in FIG. 1. In the manual shift mode, therefore, the individual gear stages can be directly selected, but the engine may run over if a low gear stage is selected in a highspeed running state. Here will be described a shift unit which is equipped with a mechanism for preventing the disadvantage of overrun in advance.

Figure 19A:
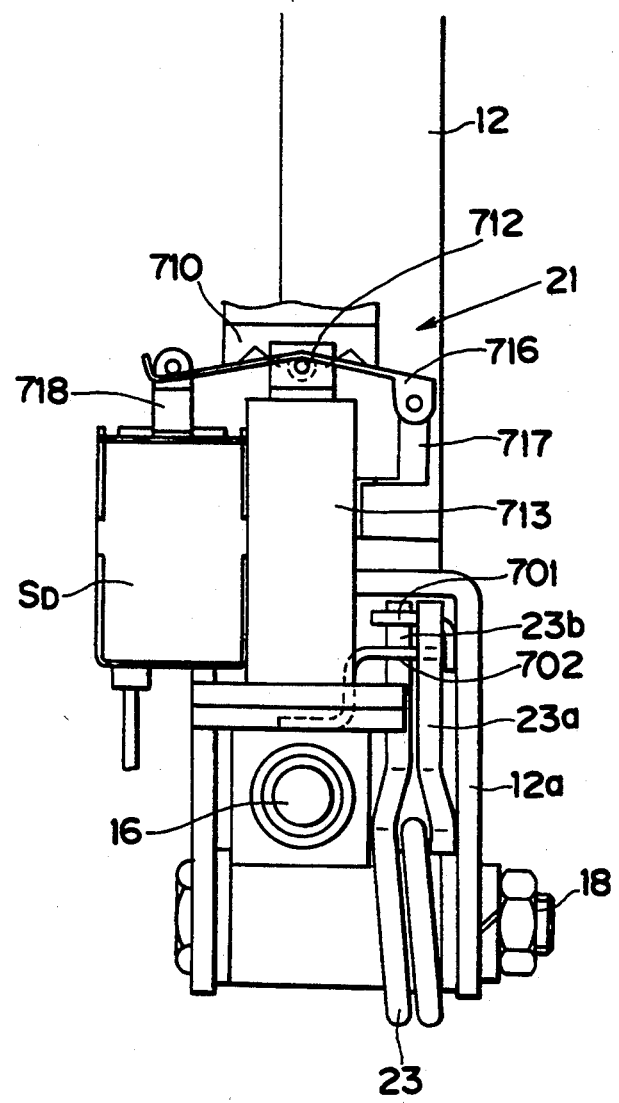
FIG. 19A is a side elevation showing a portion of both a mechanism for returning the shift lever to a drive range position and a detent mechanism.
Figure 19B:
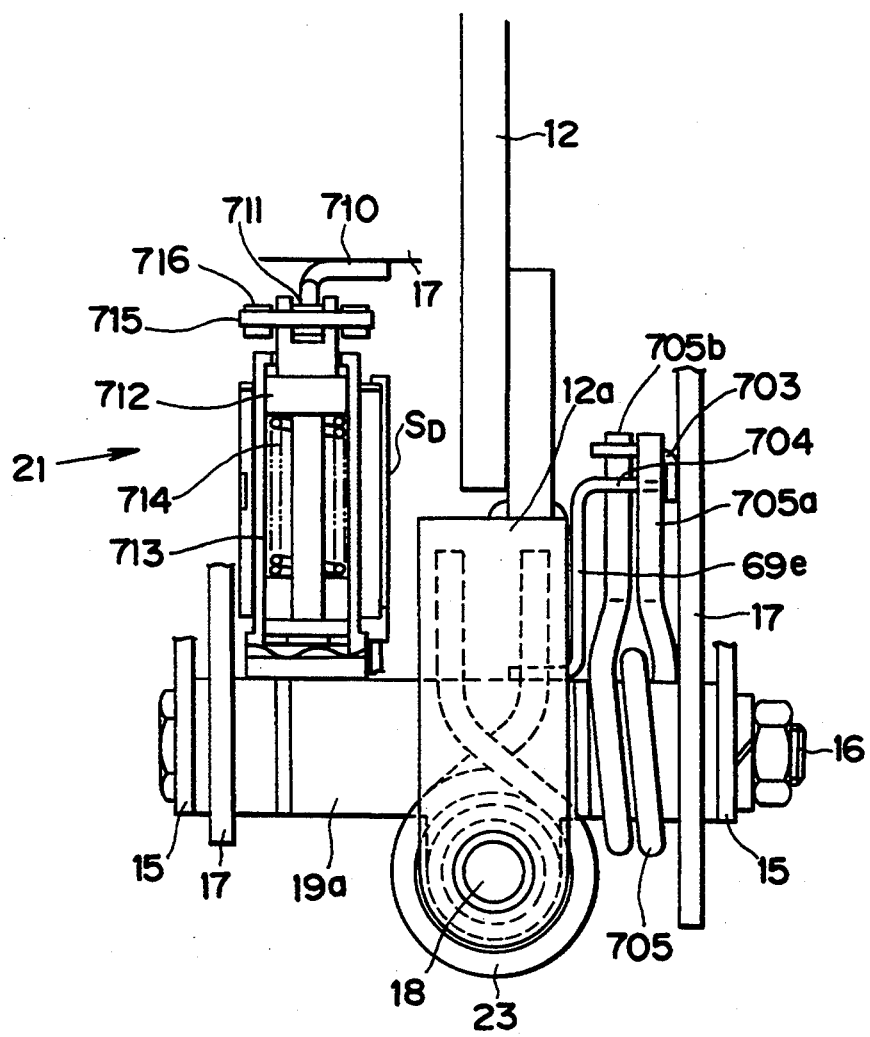
FIG. 19B is a front elevation showing a portion of those mechanisms.

FIGS. 19A and 19B show a mechanism for supporting the shift lever 12 so that it can be manipulated back and forth and to the right and left, a detent mechanism for establishing a moderate feel when the shift lever 12 is manipulated longitudinally of the vehicle, and a mechanism for returning the shift lever 12 to the D-range position or the neutral position.

The shift lever 12 is held on the stationary member 15 through the cross sleeve 19, as has been described hereinbefore. This cross sleeve 19 has two cylindrical portions 19a and 19b integrated such that they are vertically displaced to cross at a right angle. In the upper and longer one 19a of the cylindrical portions 19a and 19b, there is fitted a bolt, by which the cylindrical portion 19a is turnably attached to the stationary member 15. Moreover, the retainer 17 is turnably supported by having its two end portions fitted in the cylindrical portion 19a.

The fork 12a attached to the lower end portion of the shift lever 12 rides on the upper side of the longer cylindrical portion 19a and extends to the two end portions of the lower and shorter cylindrical portion 19b. The fork 12a is so supported by the longitudinal pin 18, which extends through the fork 12a and is fitted in the cylindrical portion 19b to act as a bolt, that it can turn on the longitudinal pin 18.

The fork 12a has its inner face equipped with a torsion spring abutment member 701 which protrudes in parallel with the longitudinal pin 18. On the upper face of the cross sleeve 19, there is fixed another torsion spring abutment member 702 which vertically faces the former torsion spring abutment member 701 when the shift lever 12 Is in the D-range position. Moreover, those abutment members 701 and 702 are clamped by the actuation ends 23a and 23b of the torsion spring 23 fitted in the shorter cylindrical portion 19b. If each of the abutment members 701 and 702 is displaced to the right or left, the torsion spring 23 has its actuation ends 23a and 23b moved so that it is deformed. As a result, this torsion spring 23 acts to return the shift lever 12 to the transverse neutral position, i.e., into the I-shaped groove 13.

To the inner side face of the retainer 17 and the upper face of the cross sleeve 19, on the other hand, there are attached a pair of torsion spring abutment members 703 and 704 similar to the foregoing abutment members 701 and 702. The latter torsion spring abutment members 703 and 704 are positioned to face each other vertically when the shift lever 12 is in the D-range position. A torsion spring 705 is fitted in the lower cylindrical portion 19a and has its two actuation ends 705a and 705b clamping the abutment members 703 and 704. If the shift lever 12 is fallen back or forth, the abutment members 703 and 704 are longitudinally displaced to deform the torsion spring 705 so that the torsion spring 705 acts to return the shift lever 12 to the longitudinally neutral position, i.e., to the D-range position.

Here will be described the detent mechanism 21. A detent block 710 having a roughed lower face is so fixed on the lower face of the retainer 17 that its rough portion is arranged in parallel with the direction of the array of the individual range positions. A roller 711 to be fitted on the rough portion is attached to the upper end portion of a plunger 712, which is so held in a holder 713 attached to the upper face of the cross sleeve 19 as to move vertically and is urged upward by a spring 714. A pin 715 holding the roller 711 protrudes to the righthand and lefthand sides of the plunger 712 and has its protrusions engaging with the central portion of a release lever 716. This release lever 716 is a canthever which has its one end portion hinged to a bracket 717 attached to the outer face of the holder 713 and its free end connected to a plunger 718 of the detent releasing solenoid SD. This solenoid SD is so fixed on the outer face of the holder 713 as to direct the plunger 718 upward, and moves the plunger 718 downward, when energized, to pull up the free end of the release lever 716.

Figure 20:
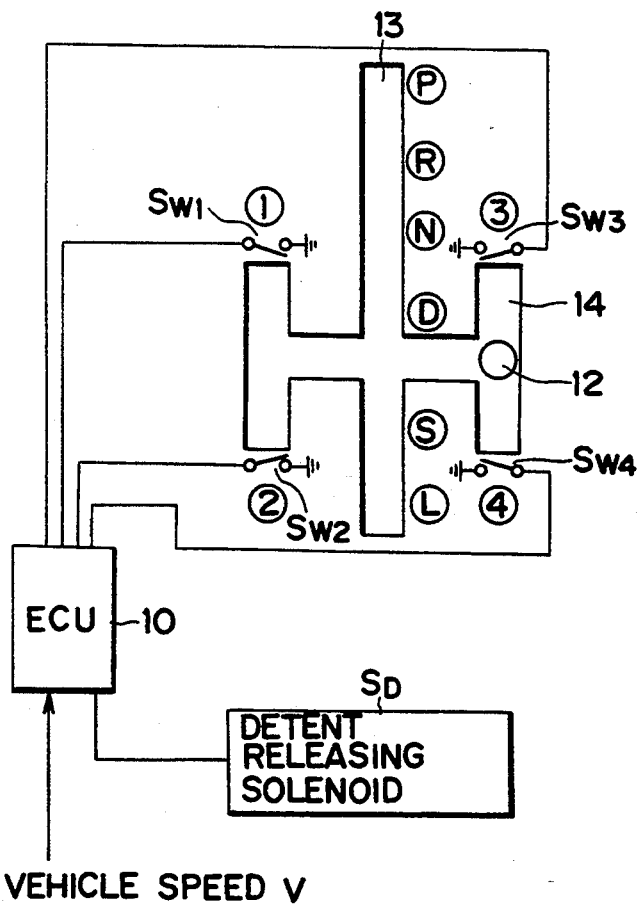
FIG. 20 is a flow chart for controlling another shift unit.

FIG. 20 shows a control system by the shift unit described above. The individual positions of the first to fourth speeds connected through the H-shaped groove 14 are arranged with switches SW1, SW2, SW3 and SW4 to be actuated by the shift lever 12. These switches SW1 to SW4 are connected with the electronic control unit 10. Moreover, the detent releasing solenoid SD is also connected with the electronic control unit 10 so that it may be turned ON in response to the electronic control unit 10 when the vehicle speed exceeds the allowable maximum of the gear stage selected.

Figure 21:
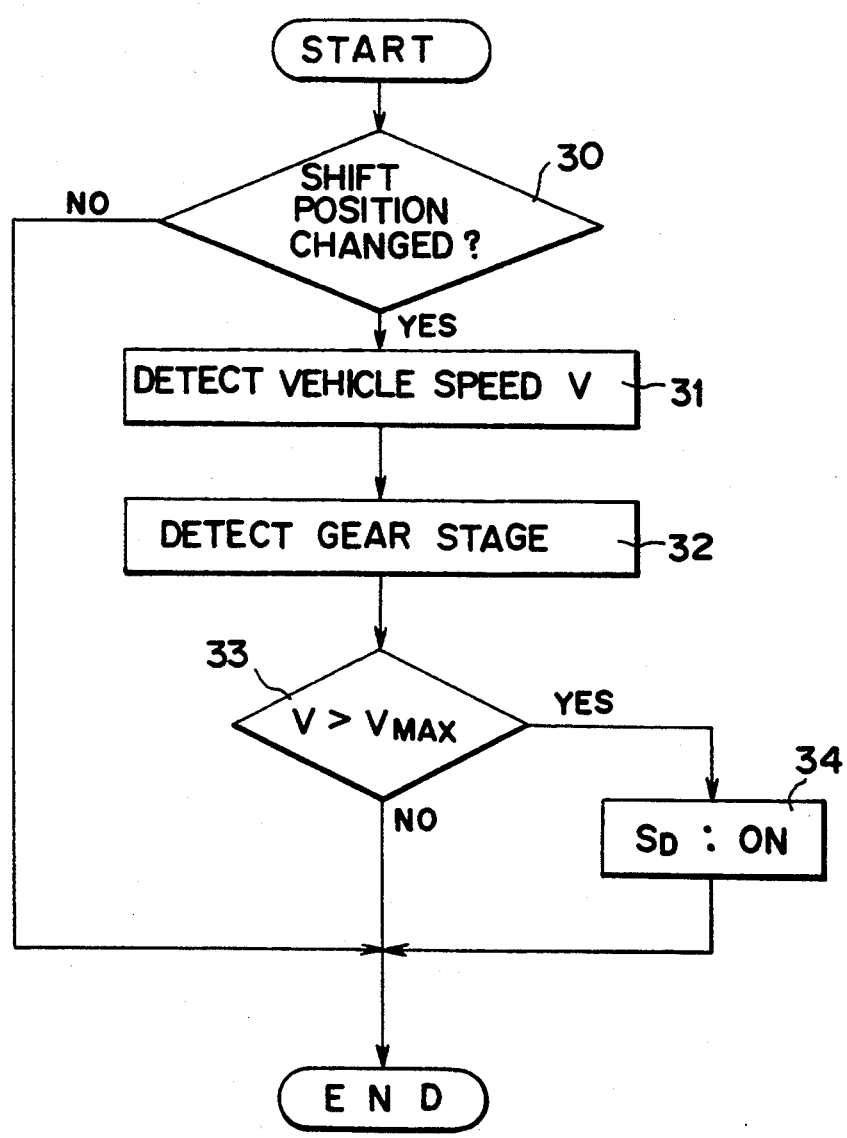
FIG. 21 is a flow chart showing a control routine for inhibiting a manual shift to prevent the overrun of the engine.

FIG. 21 is a flow chart showing a control routine of the detent releasing solenoid SD. At Step 30, by monitoring the present gear stage and the gear stage newly demanded, It is decided whether the shift position has been changed. If a difference arises between the two gear stages, it is decided that the shift position has been changed. If the answer of Step 30 is NO, this routine is skipped out. If the answer is YES, the present vehicle speed V is detected (at Step 31) on the basis of the signals of the vehicle speed sensors $S_{P1}$ and $S_{P2}$. At subsequent Step 32, the newly selected gear state is detected on the basis of the signals of the switches SW1 to SW4. At Step 33, the present vehicle speed V is compared with the maximum limit speed $V_{max}$ which is determined for each gear stage selected. This maximum limit speed $V_{max}$ is determined on the basis of the allowable RPM of the engine and the gear ratio of each gear stage and is stored in the table of the ROM 33 of the electronic control unit 10. If the present vehicle speed V is not over the maximum limit speed $V_{max}$, the control is ended. If the maximum limit speed $V_{max}$ is exceeded, the detent releasing solenoid SD is turned ON (at Step 34).

When the detent releasing solenoid SD is turned ON, its plunger 718 pulls down the free end of the release lever 716 so that the plunger 712 connected through the pin 715 to the intermediate portion of the release lever 716 is pushed down against the action of the spring 714. As a result, the roller 711 comes out of the detent block 710 so that the shift lever 12 is released from its state in which it is prevented from its longitudinal motions by the retainer 17. On the other hand, the retainer 17, to which is applied the returning force by the torsion spring 705 through the abutment members 703 and 704, is returned together with the shift lever 12 to the longitudinal neutral position as the roller 711 comes out of the detent block 710. In this state, the shift lever 12 can be freely moved to the right and left so that it is returned to the D-range position by the returning force of the other torsion spring 23. As a result, the selection of the gear stages by the manual operation is substantially inhibited.

Incidentally, there is a shift unit in which the individual gear stage positions of the manual shift mode are arranged across the straight array of the individual range positions of the automatic shift mode. In this shift unit, the switching to the manual shift mode and the selection of the gear stages are effected by moving the shift lever 12 to the individual gear stage positions. In tills shift unit, therefore, the overrun of the engine can be prevented in advance by providing means for directly inhibiting the shift lever 12 from coming to the position in which the maximum limit speed selects a gear stage corresponding to a vehicle speed lower than the actual one.

Figure 22:
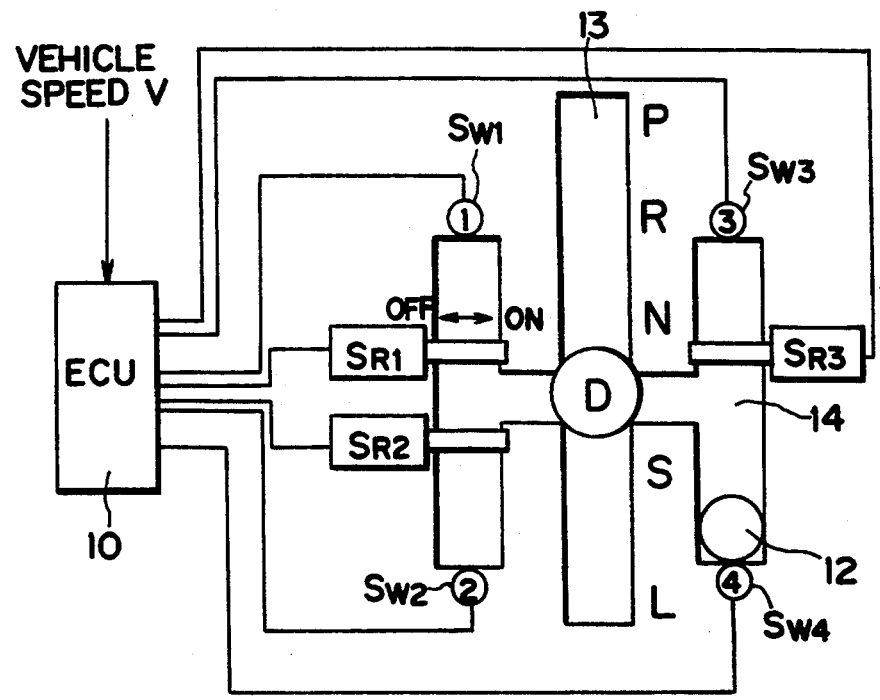
FIG. 22 is a flow chart showing still another shift unit.

FIG. 22 is a schematic diagram showing the shift unit which is equipped with three solenoids $S_{R1}$, $S_{R2}$ and $S_{R3}$ as such inhibit means. In tills shift unit, the H-shaped groove 14 is arranged at the entrance portions to the first, second and third speeds, respectively, with the solenoids $S_{R1}$, $S_{R2}$ and $S_{R3}$ which have their plungers protruded all over the groove widths. These solenoids $S_{R1}$, $S_{R2}$ and $S_{R3}$ are turned ON/OFF by the electronic control unit 10.

Figure 23:
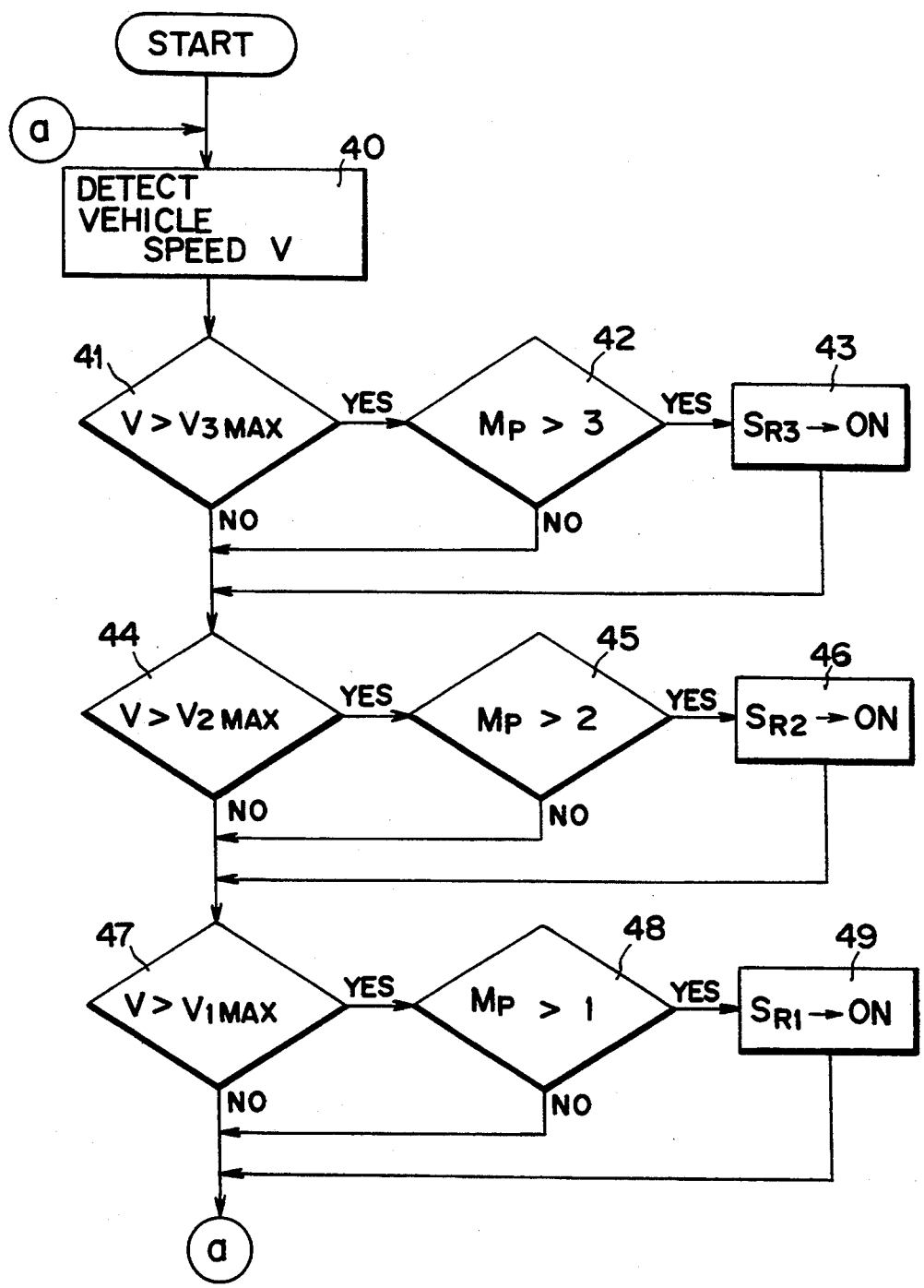
FIG. 23 is a flow chart showing another control routine for inhibiting the manual shift to prevent the overrun of the engine.

FIG. 23 is a flow chart showing a control routine for the solenoids $S_{R1}$, $S_{R2}$ and $S_{R3}$. At Step 40, the present vehicle speed is detected on the basis of the output signals of the vehicle speed sensors $S_{P1}$ and $S_{P2}$. It is then decided (at Step 41) whether the vehicle speed V is higher than the maximum limit speed $V_{3max}$ for the third speed. If the answer is YES, the routine advances to Step 42, at which it is decided whether the present gear stage $M_p$ selected exceeds that of the third speed. If a higher gear stage (of the fourth speed, for example) is selected, the solenoid $S_{R3}$ disposed at the entrance of the third-speed position is turned ON (at Step 43) to inhibit the shift lever 12 from being moved to the third-speed position. In other words, the third speed in the manual shift mode is inhibited.

If the answer of Step 41 or Step 42 is NO and if the control of Step 43 is executed, the routine advances to Step 44, at which the vehicle speed for the second speed is decided. Specifically, it is decided at Step 44 whether the present vehicle speed V exceeds the maximum limit speed $V_{2max}$ of the 2nd speed. If the answer is YES, it is decided (at Step 45) whether the gear stage $M_p$ selected at present exceeds the second speed. If the answer is YES, the solenoid at the entrance of the second-speed position is turned ON (at Step 46). As a result, the shift lever 12 cannot be moved to the second-speed position so that the second speed in the manual shift mode is substantially inhibited.

If the answer of Step 44 or Step 45 is NO and if the control of Step 46 is executed, the routine advances to Step 47, at which a similar decision for the first speed is executed. Specifically, it is decided (at Step 47) whether the present vehicle speed V exceeds the maximum limit speed $V_{1max}$ of the first speed. If the answer is YES, it is decided (at Step 48) whether the gear stage $M_P$ selected at present exceeds that for the first speed. If the answer is YES, the solenoid $S_{R1}$ at the entrance of the first-speed position is turned ON to inhibit the first speed in the manual shift mode.

As a result, the gear stages to be selected in the manual shift mode are so limited that their maximum limit speeds are higher than the actually running one so that the overrun of the engine can be prevented in advance.

There is another shift unit, in which the I-shaped groove 13 for guiding the shift lever 12 to the individual range positions and the H-shaped groove 14 for guiding the shift lever 12 to the individual gear stage positions in the manual shift mode are crossed in the D-range position. In this shift unit, the direction of moving the shift lever 12 to the first- or third-speed position is identical to the that of moving the shift lever 12 to the N-range position the shift lever 12 is desirably inhibited in the manual shift mode from being moved to the N-range position. Specifically, if the shift lever 12 is moved to the N-range position, the manual valve 100 is switched to bring the automatic transmission 2 to the neutral state so that the engine may probably run over.

Figure 24:
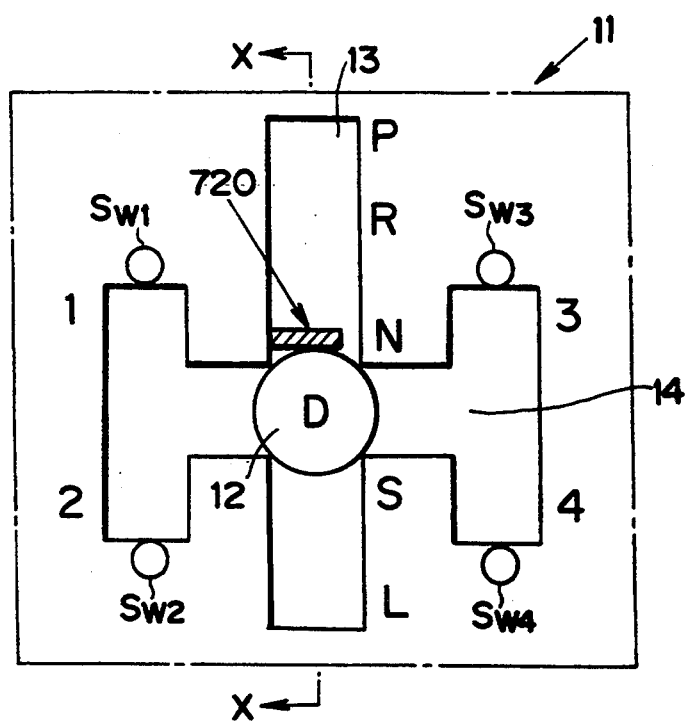
FIG. 24 is a diagram showing the layout of the individual positions of ranges and gear stages of the shift unit which is equipped with a detent pin for inhibiting a neutral position.
Figure 25:
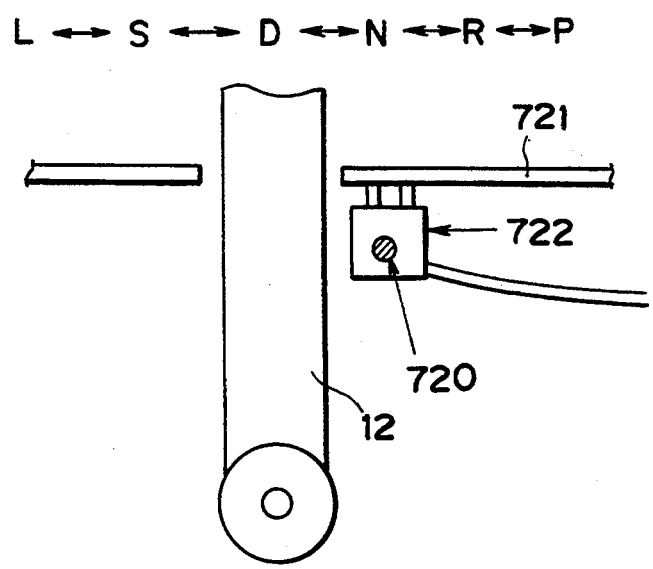
FIG. 25 is a section taken along line X—X of FIG. 24.
Figure 26:
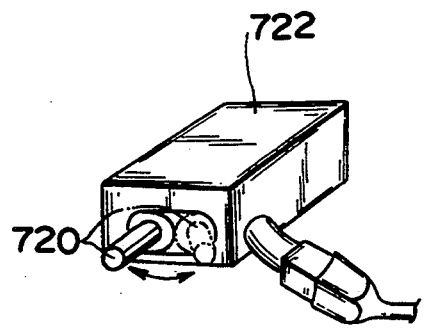
FIG. 26 is a perspective view showing an actuator for actuating the detent pin.
Figure 27:
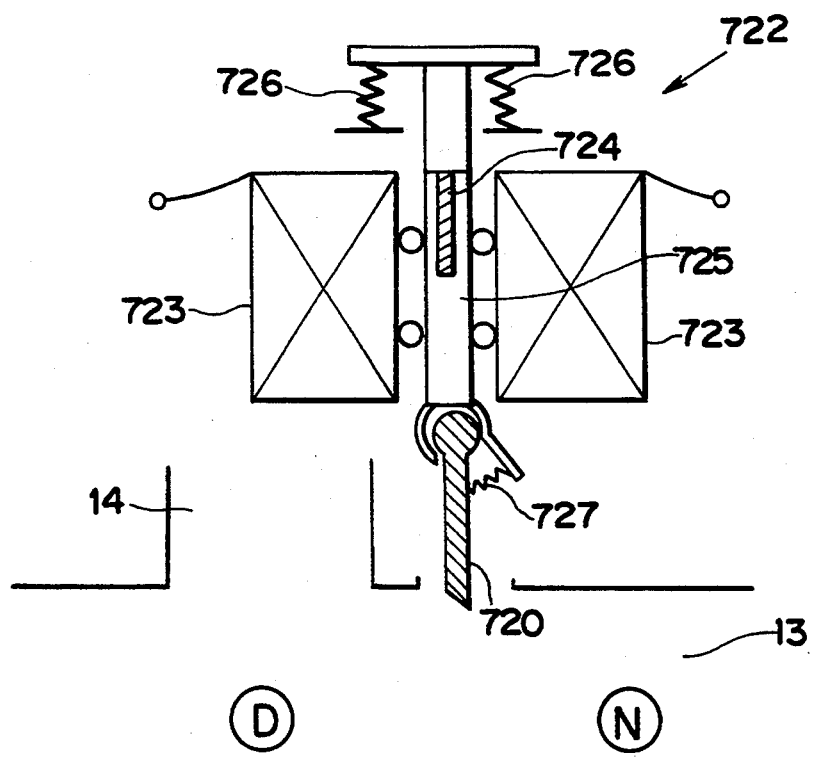
FIG. 27 is a schematic diagram showing a mechanism for actuating the detent pin.

The shift unit 11 shown in FIG. 24 is equipped with means for inhibiting the shift lever 12 from being moved from the D-range position to the N-range position. Specifically, in the aforementioned I-shaped groove 13 and between the D-range position and the N-range position, there is disposed a detent pin 720 which is selectively protruded into the I-shaped groove 13 for inhibiting the shift lever 12 from being moved from the D-range position to the N-range position. As shown in FIG. 25, the detent pin 720 is protruded into the I-shaped groove 13 by a solenoid 722 which is attached to the lower face of an indicator upper plate 721. The solenoid 722 is controlled by the transmission electronic control unit 10 and is constructed, as shown in FIGS. 26 and 27, the center of a coil 723 for generating a magnetic force if energized, there is longitudinally movably arranged a plunger 725 which has a magnetic member 724. The plunger 725 is always urged backward by a spring 726. The aforementioned detent pin 720 is so rotatably attached to the leading end portion of the plunger 725 that its leading end portion can move from the D-range position to the N-range position. Between the detent pin 720 and the leading end portion of the plunger 725, there is interposed a spring 727 for applying an elastic force in a direction to regulate such rotation of the detent pin 720. In short, in case a force against the spring 727 is exerted upon the shift lever 12, the shift from the D-range position to the N-range position can be effected to cope with a special case.

The control of inhibiting the shift to the N-range position by the detent pin 720, i.e., the ON/OFF control of the solenoid 722 for driving the detent pin 720 is carried out in the following manner.

Figure 28A:
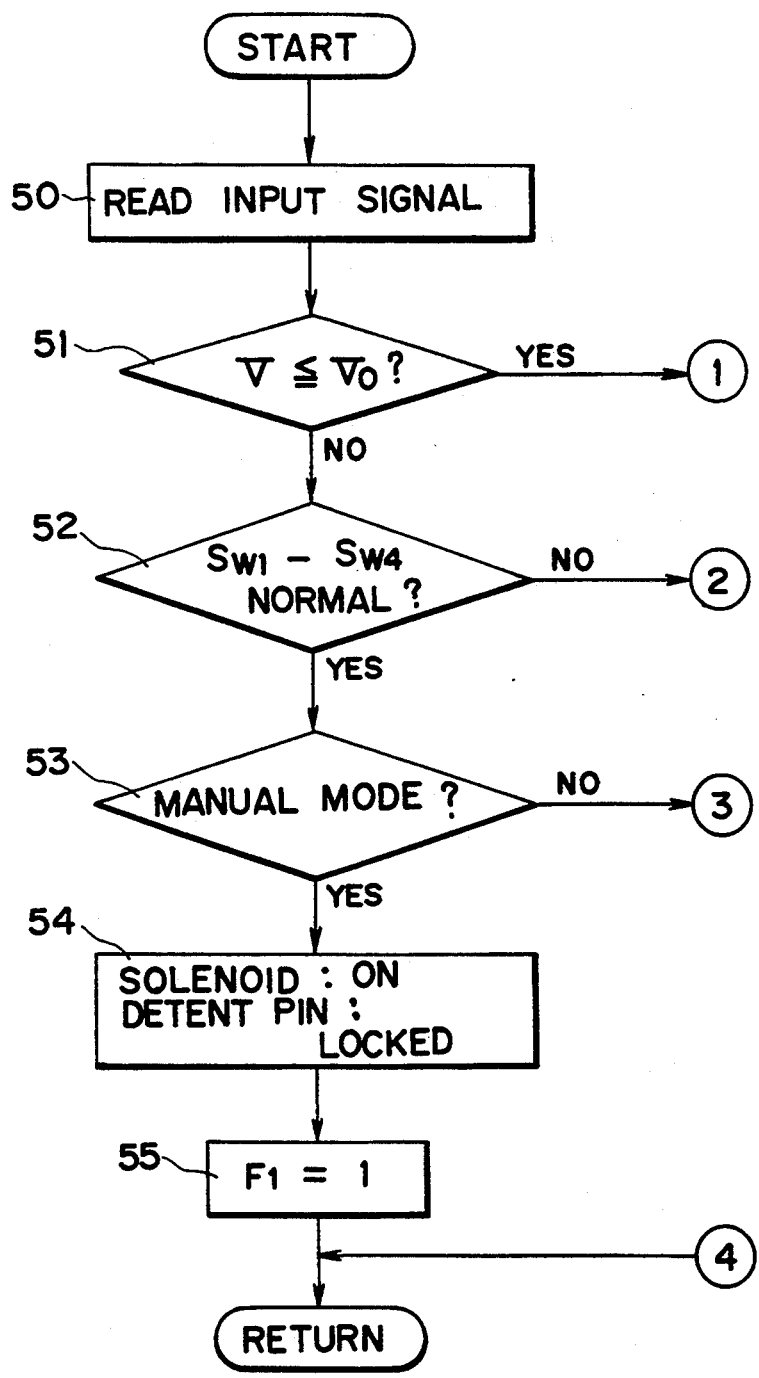
FIGS. 28A and 28B are flow charts showing a control routine of the detent pin.
Figure 28B:
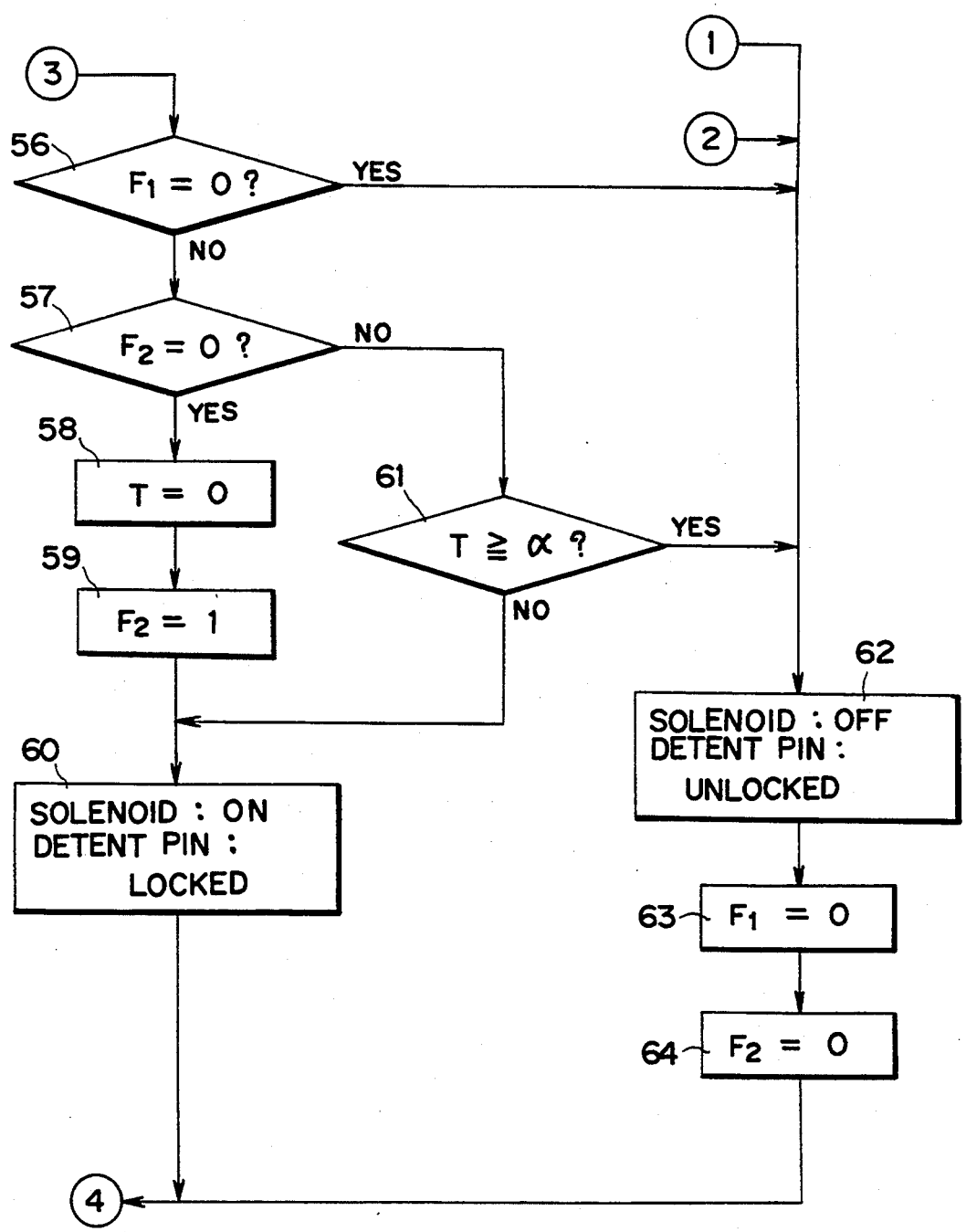

FIGS. 28A and 28B are flow charts showing a routine for controlling the solenoid 722. Incidentally, FIGS. 28A and 28B bisects the single routine for conveniences of illustration, and circled numerals indicate that lines of the identical numerals are connected.

In FIG. 28A, at first Step 50, an input signal is read. At Step 51, it is decided whether the vehicle speed V is equal to or lower than the reference vehicle speed $V_o$ (e.g., 10 Km/h). If the answer is NO, that is, if the vehicle speed V exceeds the reference vehicle speed $V_o$, the routine advances to Step 52, at which it is decided whether the switches $S_{W1}$ to $S_{W4}$ arranged in the respective gear stage positions of the shift unit 11 are normal. If the answer is YES, the routine advances to Step 53, at which it is decided whether the manual shift mode is selected. This decision can be made by examining what of the switches to $S_{W4}$ is turned ON. If the manual shift mode is selected so that the answer of Step 53 is YES; the solenoid 722 is turned ON (at Step 54) to effect the lock state in which the detent pill 720 is protruded into the t-shaped groove 13. Then, the flag $F_1$ for discriminating the mode is set to "1" (at Step 55), and the routine is returned. Here, the reason whey the detent pin 720 is locked by turning ON the solenoid 722 is to release the inhibition of the N-range by the detent pin 720, if the solenoid 720 is OFF due to the failure in the electric system, thereby to set the neutral state.

If the answer of Step 53 is NO because none of the switches $S_{W1}$ to $S_{W4}$ are ON, the routine advances to Step 56, at which it is decided whether the flag $F_1$ is at "0". Immediately after the manual shift mode has been selected, the flag $F_1$ is at "1". Then, the answer of Step 56 is NO. In this case, therefore, the routine advances to Step 57, at which it is decided whether the flag $F_2$ is at "0". This flag $F_2$ is discriminate that the time is counted by the timer T, and is reset at first to zero. If this control process is reached at first, the answer of Step 57 is YES, and the routine advances to Step 58. At Step 58, the timer T is reset to zero, and the time counting is started. At subsequent Step 59, the flag $F_2$ is set to "1". At Step 60, the solenoid 722 is turned ON to lock the detent pin 720. Then, the routine is returned. On the other hand, if the answer of Step 57 Is NO, that is, if the time counting by the timer T has already been carried out, the routine advances to Step 61, at which it is decided whether the counted value of the timer T exceeds a predetermined value $\alpha$. If the answer of Step 61 is NO because the predetermined time period has not been elapsed yet, the control of Step 60 is continued. While the shift lever 12 is being moved between the individual gear stage positions, none of the switches $S_{W1}$ to $S_{W4}$ output any signal, but the shift mode per se is the manual one. Thus, the detent pin 720 is held in the locked state for a predetermined time period.

If the answer of Step 61 is YES, it can be deemed that the driver does not select any new gear stage position although he has brought the shift lever 12 away from any of the gear stage positions, namely, that the driver highly probably selects the automatic shift mode. In this case, the routine advances to Step 62, at which the solenoid 722 is turned OFF to retract the detent pin 720 out of the I-shaped groove 13 thereby to invite the unlocked state. After this, the routine further advances sequentially to Step 63 and Step 64, at which the flags $F_1$ and $F_2$ are individually set to "0", and the routine is returned.

Incidentally, If the decision of Step 51 is YES because the vehicle speed V is no more than the reference vehicle speed $V_o$, the vehicle is highly probably halted. Therefor, the routine advances to Step 62, at which the locked state by the detent pin 720 is released. If any of the switches $S_{W1}$ to $S_{W4}$ is troubled to give the answer NO to Step 52, the routine also advances to Step 62. In addition, if the shift mode is not the manual one and if the flag $F_1$ is at "0", that is, if the answer of Step 56 is YES, the routine also advances to Step 62 for maintaining the unlocked state of the detent pin 720.

In the shift unit 11 described above, therefore, it is inhibited in the manual mode to select the N-range and to cause the neutral state without the driver's visual confirmation of the position of the shift lever 12. Thus, the operability of the driver can be improved.

In the control routine shown in FIGS. 28A and 28B, the detent pin 720 is immediately brought into the locked state if the shift mode is decided to be the manual one. However, a modification can be made by turning ON the solenoid 722 a predetermined lapse of time after the shift mode has been decided to belong the manual one. Then, the number of turning ON/OFF the solenoid 722 can be reduced to improve the operability.

The shift control system according to the present invention can change the ranges in the automatic shift mode, but the switching to the reverse range or the parking range is carried out only with a positive will of the driver. Thus, the shift control system is equipped with the aforementioned inhibit mechanism 20. This inhibit mechanism 20 is similar to that of the existing general shift unit for the automatic transmission but is given the following special construction for allowing the shift lever 12 to move back and forth and to the right and left.

In FIGS. 2A and 2B, the push button 12b disposed in the top of the shift lever 12 is connected to the inhibit mechanism 20 by a flexible cable 800 which is fitted in the shift lever 12. This flexible cable 800 has its cable 802 inserted into a tube 801. This tube 801 has its one terminal fixture 803 fixed on the end portion of the stem 12d, and the cable 802 has its one terminal fixture 804 abutting against the lower face of the push button 12b.

On the other hand, the inhibit mechanism 20 if fixed on the side plate 15c which is opposed to the portion having the cam hole 17c. In a holder 805 fitted in the side plate 15c and directed vertically, there is vertically movably fitted a push rod 807 which is urged upward by a spring 806. The push rod 807 is equipped at its upper end portion with a pin 808. This pin 808 extends vertically movably through the side plates 15c and is fitted in the cam hole 17c. The other end portion of the cable 802 is connected to the pin 808. The other end portion of the tube 801 is fixed on the holder 805.

Figure 29:
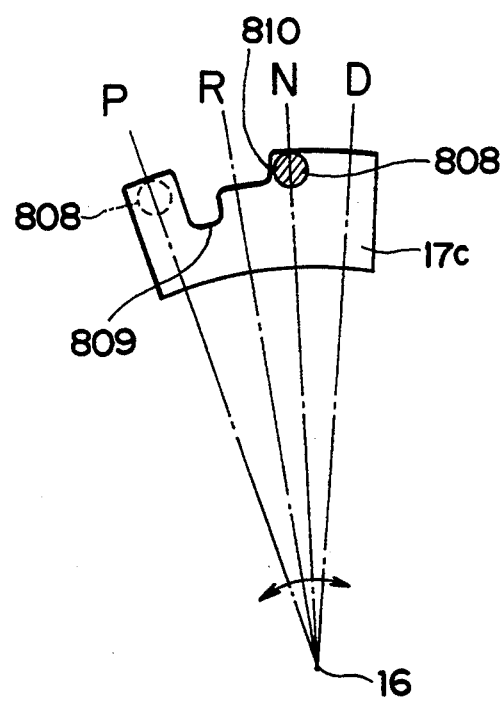
FIG. 29 is a diagram showing the shape of a cam hole.

The aforementioned cam hole 17c has its shape exemplified in FIG. 29. This cam hole 17c provides a cam portion at its upper edge portion and generally has an arcuate shape on the transverse pin 16. The cam portion is formed with: a root portion 809 for providing an engage portion to define the P-range position and the R-range position; and a step portion 810 directed from the N-range position to the R-range position for providing an engage portion to define the R-range position and the N-range position.

Since the pin 808 is pushed upward through the push rod 807 by the spring 806, it goes into the position, as indicated by broken lines in FIG. 29, if the shift lever 12 is set in the P-range position. As a result, the shift lever 12 cannot be moved from the P-range position. If, in this state, the push button 12b is pushed, the pin 808 is pushed down through the flexible cable 800 so that it can move across the aforementioned root portion 809. As a result, the shift lever 12 can be moved to another range position. As apparent from the shape of the cam hole 17c shown in FIG. 29, the push button 12b has to be pushed each time of the shift between the P-range position and the N-range position and from the N-range position to the R-range position.

The inhibit mechanism 20 described above is constructed such that the cam hole 17c is formed in the retainer 17 to be longitudinally moved together with the shift lever 12, such that the stationary member 15 is attached to the pin 808 which is moved up and down by the actuation of the push button 12b, and such that the shift lever 12 is turned to the right and left relative to the retainer 17. As a result, even the shift unit which Is additionally given a function to effect the switching to the manual shift mode can be made small.

Incidentally, the present invention should not be limited to the foregoing embodiments, but it is sufficient that any range for the automatic shift mode, e.g., the N-range should not be set in the state of the manual shift mode. Thus, the present invention may be constructed such that the motion of the shift lever is inhibited by a mechanism other than the aforementioned detent pin, such that the shift locking solenoid For inhibiting the reverse range is used to inhibit the motion of the shift lever, or such that the selection of the running ranges is inhibited by adding a new solenoid valve to the oil pressure circuit.

In the foregoing embodiments, moreover, the detent pin is turnably connected to the plunger of the solenoid so that the shift lever can be set in a special case in the N-range position. However, the construction may be modified such that a suitable unlocking button may be provided and pushed in the special case to release the inhibition of the motion of the shift lever by the detent pin from the D-range position to the N-range position.

The advantages to be obtained from the present invention will be generally described in the following. The individual gear stage positions to be selected in the manual shift mode are arrayed in the shape of letter "H" at the two sides across the straight array of the individual range positions to be selected in the automatic shift mode. As a result, the distance for the shift lever to be moved can be shortened to improve the operability and reduce the size of the system.

If, moreover, the gear stage is specified from the fact that the two switches are turned ON, the interchange between the automatic shift mode and the manual shift mode can be ensured while facilitating the decision of the failure of the switch system.

At the shifting time in the manual shift mode, the engine braking frictional engagement means for one gear stage are disengaged by bringing the shift lever from the position for the gear stage and are engaged at a new gear stage by bringing the shift lever into the position for the new gear stage, so that the shifting operation can be carried out promptly and smoothly.

At the time of the manual shift mode, the engine can be prevented from any overrun by deciding a gear stage to be set on the basis of the vehicle speed.

If there is provided means for inhibiting the setting of the N-range in the manual shift mode, the set positions of the shift lever need not be confirmed one by one. Then, the operability can be improved while preventing the overrun of the engine.

What is claimed is:

1. A shift control system for an automatic transmission which has a shift unit for selecting by manipulating a shift lever an automatic shift mode, in which a gear stage is determined on the basis of a running stage of a vehicle, and a manual shift mode in which a gear state is determined from an output signal based on the manipulation, wherein said shift unit has a plurality of range positions including a drive range capable of setting a plurality of forward gear stages and includes: a first shift path for guiding said shift lever into said range positions; and a first partial shift path intersecting said first shift path; and a second partial path intersecting the first partial shift path for guiding said shift lever into a gear stage for instructing a forward gear stage in the manual shift mode, comprising:

a first switch adapted to be turned ON by moving said shift lever to one of said second partial shift paths, for outputting a signal;

a second switch adapted to be turned ON by moving said shift lever to the other of said second partial shift paths, for outputting a signal;

a third switch adapted to be turned ON by moving said shift lever in one direction in said second shift path, for outputting a signal; and a fourth switch adapted to be turned ON by moving said shift lever in the other direction in said second shift path, and gear stage decide means for deciding a gear stage to be set, in accordance with the combination of the ON states of said four switches.

2. A shift control system for an automatic transmission according to claim 1, wherein said gear stage decide means includes means for setting said drive range when at least three of said four switches are turned ON.

3. A shift control system for an automatic transmission according to claim 1, wherein said gear stage decide means includes means for setting the highest one of the gear stages to be set, when at least three of said four switches are turned ON.

4. A shift control system for an automatic transmission according to claim 1, wherein said gear stage decide means includes means for deciding failure of a control system including said four switches according to the order, in which at least three of said four switches are switched from OFF to ON states.

5. A shift control system for an automatic transmission according to claim 1, wherein said manual shift instruct means includes switches disposed at the individual end portions of said second shift path and adapted to be turned ON by said shift lever, and wherein said gear stage set means includes means for setting the gear stage, which corresponds to the switch turned ON, in the effective state of the engine braking.

6. A shift control system for an automatic transmission, which has a shift unit for selecting by manipulating a shift lever an automatic shift mode, in which a gear stage is determined on the basis of a running stage of a vehicle, and a manual shift mode in which a gear state is determined from an output signal based on the manipulation, wherein said shift unit has a plurality of range positions including a drive range capable of setting a plurality of forward gear stages and includes: a first shift path for guiding said shift lever into said range positions; and a second shift path intersecting said first shift path for guiding said shift lever into a gear stage for instructing a forward gear stage in the manual shift mode; and manual shift instruct means for outputting a signal instructing a gear stage corresponding to said gear stage position when said shift lever is moved to said gear stage position, comprising, gear stage set means for setting the gear stage which is instructed by the output signal of said manual shift instruct means, wherein said automatic transmission includes engine braking frictional engage means for effecting an engine braking at a predetermined gear stage, and wherein said manual shift instruct means includes means for releasing said engine braking frictional engage means when said shift lever comes out of the gear stage position for instructing said predetermined gear stage so that the output of the signal instructing said gear stage is interrupted.

7. A shift control system for an automatic transmission, which has a shift unit for selecting by manipulating a shift lever an automatic shift mode, in which a gear stage is determined on the basis of a running stage of a vehicle, and a manual shift mode in which a gear state is determined from an output signal based on the manipulation, wherein said shift unit has a plurality of range positions including a drive range capable of setting a plurality of forward gear stages and includes: a first shift path for guiding said shift lever into said range positions; and a second shift path intersecting said first shift path for guiding said shift lever into a gear stage for instructing a forward gear stage in the manual shift mode; and manual shift instruct means for outputting a signal instructing a gear stage corresponding to said gear stage position when said shift lever is moved to said gear stage position, comprising, gear stage set means for setting the gear stage which is instructed by the output signal of said manual shift instruct means, mode decide means for deciding the shift mode which is selected by said shift unit; and means for inhibiting the state, in which any range in said automatic shift mode is selected, when it is decided that said manual shift mode is set.

8. A shift control system for an automatic transmission according to claim 7, wherein the range to be inhibited by said inhibit means is a neutral range.

9. A shift control system for an automatic transmission according to claim 7, wherein said inhibit means includes means for blocking the motion of said shift lever to the position, in which a predetermined range is to be set in said automatic shift mode, when said mode decide means decides that said manual shift mode is selected.

10. A shift control system for an automatic transmission, which has a shift unit for selecting by manipulating a shift lever an automatic shift mode, in which a gear stage is determined on the basis of a running stage of a vehicle, and a manual shift mode in which a gear state is determined from an output signal based on the manipulation, wherein said shift unit has a plurality of range positions including a drive range capable of setting a plurality of forward gear stages and includes: a first shift path for guiding said shift lever into said range positions; and a second shift path intersecting said first shift path for guiding said shift lever into a gear stage for instructing a forward gear stage in the manual shift mode; and manual shift instruct means for outputting a signal instructing a gear stage corresponding to said gear stage position when said shift lever is moved to said gear stage position, comprising, gear stage set means for setting the gear stage which is instructed by the output signal of said manual shift instruct means, vehicle speed detect means for detecting a vehicle speed;

maximum speed set means for setting the maximum speed which is allowed for each of said gear stages; and gear stage inhibit means for inhibiting the selection of the gear stage, at which the allowable maximum speed is no more than the detected vehicle speed, in said manual shift mode by comparing the vehicle speed detected by said vehicle speed detect means and said allowable maximum speed.

11. A shift control system for an automatic transmission according to claim 10, wherein said shift unit further includes: an elastic member for pushing said shift lever toward said drive range position; and a detent mechanism for holding said shift lever in each of said gear stage positions against the elastic force of said elastic member, and p1 wherein said gear stage inhibit means includes a release mechanism for releasing the holding of said shift lever in said gear stage positions by said detent mechanism.

12. A shift control system for an automatic transmission according to claim 10, wherein said elastic member includes: a first spring for urging said shift lever toward said drive range position in parallel with said first shift path; and a second spring for urging said shift lever toward said drive range position in parallel with said second shift path.

13. A shift control system for an automatic transmission according to claim 12, wherein said detent mechanism includes: a plurality of recesses arranged in parallel with said first shift path and adapted to be moved together with said shift lever in parallel with said first shift path; and a retaining member adapted to be elastically urged onto said recesses, and wherein said release mechanism includes an actuator for releasing said retaining member from said recesses against said elastic force.

14. A shift control system for an automatic transmission according to claim 10, wherein said gear stage inhibit means includes an actuator for shutting said second shift path so that said shift lever may not be moved to the gear stage position corresponding to the gear stage lower than the vehicle speed at which the allowable maximum speed is detected.

15. A shift control system for an automatic transmission according to claim 14, wherein said actuator includes: a first solenoid adapted to be protruded by a magnetic force for shutting said second shift path in the gear stage position corresponding to the first speed; a second solenoid adapted to be produced by a magnetic force for shutting said second shift path in the gear stage position corresponding to the second speed; and a third solenoid adapted to be protruded by a magnetic force for shutting said second shift path in the gear stage position corresponding to the third speed.

16. A shift control system for an automatic transmission, which has a shift unit for selecting by manipulating a shift lever an automatic shift mode, in which a gear stage is determined on the basis of a running stage of a vehicle, and a manual shift mode in which a gear state is determined from an output signal based on the manipulation, wherein said shift unit has a plurality of range positions including a drive range capable of setting a plurality of forward gear stages and includes: a first shift path for guiding said shift lever into said range positions; and a second shift path intersecting said first shift path for guiding said shift lever into a gear stage for instructing a forward gear stage in the manual shift mode; and manual shift instruct means for outputting a signal instructing a gear stage corresponding to said gear stage position when said shift lever is moved to said gear stage position, comprising, gear stage set means for setting the gear stage which is instructed by the output signal of said manual shift instruct means, wherein said shift unit further includes an inhibit mechanism for inhibiting the motion of said shift lever from a predetermined range position to another range position and for releasing the inhibiting state by a manual operation.

17. A shift control system for an automatic transmission according to claim 16, wherein said inhibit mechanism includes: a first member adapted to move together with said shift lever in parallel with said first shift path; a plurality of engage portions formed in said first member in parallel with said first shift path; a stationary member disposed in a position facing said engage portions; a pin member so held on said stationary member as to selectively engage with said engage portions; an actuation button disposed on said shift lever; and a flexible connect member connecting said actuation button and said pin member, whereby said pin member is released from said engage portion by pushing said actuation button so that said shift lever can be moved in parallel with said first shift path.

18. A shift control system for an automatic transmission, which has a shift unit for selecting by manipulating a shift lever an automatic shift mode, in which a gear stage is determined on the basis of a running stage of a vehicle, and a manual shift mode in which a gear state is determined from an output signal based on the manipulation, wherein said shift unit has a plurality of range positions including a drive range capable of setting a plurality of forward gear stages and includes: a first shift path for guiding said shift lever into said range positions; and a second shift path intersecting said first shift path for guiding said shift lever into a gear stage for instructing a forward gear stage in the manual shift mode; and manual shift instruct means for outputting a signal instructing a gear stage corresponding to said gear stage position when said shift lever is moved to said gear stage position, comprising, mode decide means for deciding a shift mode to be selected, and means for inhibiting any range except the drive range in the automatic shift mode by blocking the motion of said shift lever to the position, in which a predetermined range is to be set in said automatic shift mode, when said mode decide means decides that said manual shift mode is selected.

19. A shift control system for an automatic transmission according to claim 18, wherein the range to be inhibited by said inhibit means is a neutral range.

20. A shift control system for an automatic transmission, comprising shift mode select means for selecting an automatic shift mode, in which a gear stage is determined on the basis of a running state of a vehicle, and a manual shift mode in which a gear state is determined from an output signal based on the manipulation, comprising:

vehicle speed detect means for detecting a vehicle speed;

maximum speed set means for setting the maximum speed which is allowed for each of said gear stages; and gear stage inhibit means for inhibiting the select of the gear stage, at which the allowable maximum speed is no more than the detected vehicle speed, in said manual shift mode by comparing the vehicle speed detected by said vehicle speed detect means and said allowable maximum speed.

* * * * *

UNITED STATES PATENT AND TRADEMARK OFFICE
CERTIFICATE OF CORRECTION

PATENT NO. : 5,415,056
DATED : May 16, 1995
INVENTOR(S) : Atsushi TABATA et al.

It is certified that error appears in the above-indentified patent and that said Letters Patent is hereby corrected as shown below:

In column 29, line 8 of Claim 11, delete "p1".

Signed and Sealed this

Tenth Day of October, 1995

*Attest:*

BRUCE LEHMAN

*Attesting Officer*       *Commissioner of Patents and Trademarks*